United States Patent [19]
Milkovich et al.

[11] 3,862,097
[45] Jan. 21, 1975

[54] PROCESS FOR PREPARING COPOLYMERIZABLE MACROMOLECULAR MONOMERS HAVING A SUBSTANTIALLY UNIFORM MOLECULAR WEIGHT DISTRIBUTION

[75] Inventors: Ralph Milkovich, Naperville; Mutong T. Chiang, Palos Heights, both of Ill.

[73] Assignee: CPC International, Engelwood Cliff, N.J.

[22] Filed: July 2, 1973

[21] Appl. No.: 376,081

Related U.S. Application Data

[60] Division of Ser. No. 282,099, Aug. 21, 1972, Pat. No. 3,786,116, which is a continuation-in-part of Ser. No. 244,205, April 14, 1972, Pat. No. 3,832,423, which is a continuation-in-part of Ser. No. 117,733, Feb. 22, 1971, abandoned.

[52] U.S. Cl....... 260/93.5 A, 260/88.3 R, 260/89.1, 260/89.5 S, 260/89.7 S, 260/91.1 S, 260/93.7, 260/94.7 R, 260/94.7 A, 260/94.8, 260/94.9 GO, 260/96 R, 260/823, 260/827, 260/835, 260/836, 260/837 R, 260/851, 260/859 R, 260/874, 260/875, 260/876 R, 260/877, 260/878 R, 260/879, 260/881, 260/884, 260/885, 260/886, 260/887

[51] Int. Cl........................ C08f 29/12, C08f 29/50

[58] Field of Search.. 260/93.5 A, 94.7 A, 94.7 HA, 260/884, 886, 879, 887, 874

[56] References Cited
UNITED STATES PATENTS

| | | | |
|---|---|---|---|
| 3,050,511 | 8/1962 | Szevasc | 260/93.5 |
| 3,175,997 | 3/1965 | Hsieh | 260/85.1 |
| 3,235,626 | 2/1966 | Waack | 260/886 |
| 3,598,799 | 8/1971 | Naylor | 260/876 |
| 3,607,846 | 9/1971 | Halasa | 260/94.7 |
| 3,786,116 | 1/1974 | Milkovich | 260/93.5 |

OTHER PUBLICATIONS
Greber – Die Makromolekulare Chemic 101 – (1967) pp. 104–144.

*Primary Examiner*—John C. Bleutge
*Attorney, Agent, or Firm*—Albert P. Halluin

[57] ABSTRACT

This application discloses a process for preparing a copolymerizable macromolecular monomer comprising (a) polymerizing a vinyl-containing compound in the presence of an alkali metal hydrocarbyl anionic polymerization initiator to produce a monofunctional living polymer, (b) reacting said monofunctional living polymer with an alkylene oxide capping agent having eight or fewer carbon atoms to obtain a monofunctional alkoxide anion terminated macromolecular monomer, and (c) reacting said monofunctional alkoxide terminated macromolecular monomer with a halogen-containing compound which also contains a polymerizable moiety, said halogen-containing compound being a member selected from the group consisting of acrylyl halide, methacrylyl halide, vinyl-2-haloethyl ether, vinyl haloacetate, halomethylmaleic anhydride and its esters, allyl halide, methallyl halide, epihalohydrin, and vinylbenzyl halide to produce said macromolecular monomer having a copolymerizable end group, said copolymerizable macromolecular monomer being further characterized as having a substantially uniform molecular weight distribution such that its ratio of $\overline{M}w/\overline{M}n$ is less than about 1.1, wherein $\overline{M}w$ is the weight average molecular weight of the macromolecular monomer and $\overline{M}n$ is the number average molecular weight of the macromolecular monomer.

13 Claims, No Drawings

3,862,097

PROCESS FOR PREPARING COPOLYMERIZABLE MACROMOLECULAR MONOMERS HAVING A SUBSTANTIALLY UNIFORM MOLECULAR WEIGHT DISTRIBUTION

CROSS-REFERENCE TO RELATED APPLICATIONS

This application is a division of co-pending application Ser. No. 282,099, filed Aug. 21, 1972 now U.S. Pat. No. 3,786,116, granted Jan. 15, 1974. Application Ser. No. 282,099 is a continuation-in-part of co-pending application Ser. No. 244,205, filed April 14, 1972, now U.S. Pat. No. 3,832,423, granted Aug. 27, 1974 which in turn is a continuation-in-part of application Ser. No. 117,733, filed Feb. 22, 1971 said latter application now abandoned.

BACKGROUND OF THE INVENTION a. Statement Of The Invention

The present invention relates to chemically joined, phase separated thermoplastic graft copolymers and moved macromolecular monomers useful in the preparation of the graft coplymers.

b. Description Of The Prior Art

Polymer technology has developed to a high degree of sophistication and extensive research efforts in this direction are being undertaken to obtain improvements in polymer properties. Some of these efforts lead to polymer materials capable of competing with metals and ceramics in engineering applications. Generally, it is a requirement that these polymers be crystalline, since crystalline polymers are strong, tough, stiff and generally more resistant to solvents and chemicals than their non-crystalline counterparts.

Many poly alpha-olefins are crystalline and have excellent structural integrity; and, accordingly, have acquired increasing commercial acceptance as materials for competing with metals and ceramics. As one example, polyethylene has been regared as one of the most important polymers among the major plastics, with its production reaching about 6 billion pounds in 1970 (1.7 billion pounds of high density linear polyethylene and 4.3 billion pounds of low density polyethylene).

Despite the widespread use of this important plastic, its use has been limited to flexible, translucent, molded articles or flexible, clear films, due to its softness. The uses of polyethylene have also been limited due to its poor adhesion to many substrates and its low heat distortion, rendering it unsuitable for many high temperature applications.

Attempts by prior art workers to combine the properties of polyolefins and other polymers by either chemical or mechanical means generally has resulted in a sacrifice of many of the beneficial properties of both the polyolefin and the additional polymer. For example, graft copolymers of polyethylene and polypropylene have been prepared only with difficulty due to the inertness these polymers have with many other polymerizable monomers and polymers. The resultant graft copolymer generally has been a mixture which also contains free homopolymers.

Polyblends of a polyolefin with another polymer prepared by blending quantities of the two polymers together by mechanical means have been generally unsuitable for many applications due to their adverse solubility or extractability properties when used with various solvent systems, particularly when containing a rubbery, amorphous component.

The above considerations recognized by those skilled in the art with respect to the incompatibility of polyolefins with other polymers find almost equal applicability in the case of other plastics such as the polyacrylates, polymethacrylates, polyvinylchlorides, etc. Thus, the incompatibility of both natural and synthetic polymers becomes increasingly apparent as more and more polymers having particularly good properties for special uses have become available, and as efforts have been made to combine pairs of these polymers for the purpose of incorporating the different, good properties of each polymer into one product. More often than not, these efforts have been unsuccessful because the resulting blends have exhibited an instability, and in many cases the desirable properties of the new polymers were completely lost. As a specific example, polyethylene is incompatible with polystyrene and a blend of the two has poorer physical properties than either of the homopolymers. These failures were at first attributed to inadequate mixing procedures, but eventually it was concluded that the failures were due simply to the inherent incompatibilities. Although it is now believed that this is a correct explanation, the general nature of such incompatibility has remained somewhat unclear, even to the present. Polarity seems to be a factor, i.e., two polar polymers are apt to be more compatible than a polar polymer and a non-polar polymer. Also, the two polymers must be structurally and compositionally somewhat similar if they are to be compatible. Still further, a particular pair of polymers may be compatible only within a certain range of relative proportions of the two polymers; outside that range they are incompatible.

Despite the general acceptance of the fact of incompatibility of polymer pairs, there is much interest in devising means whereby the advantageous properties of combinations of polymers may be combined into one product.

One way in which this objective has been sought involves the preparation of block or graft copolymers. In this way, two different polymeric segments, normally incompatible with one another, are joined together chemically to give a sort of forced compatibility. In such a copolymer, each polymer segment continues to manifest its independent polymer properties. Thus, the block or graft copolymer in many instances possesses a combination of properties not normally found in a homopolymer or a random copolymer.

Recently, U.S. Pat. No. 3,285,626 to Waack, assigned to Dow Chemical Company, described a method for preparing graft copolymers of controlled branch configuration. It is desired that the graft copolymers are prepared by first preparing a prepolymer by reacting a vinyl metal compound with an olefinic monomer to obtain a vinyl terminated prepolymer. After protonation and catalyst removal, the prepolymer is dissolved in an inert solvent with a polymerization catalyst and is thereafter reacted with either a different polymer having a reactive vinyl group or a different vinyl monomer under free-radical conditions.

The current limitations on the preparation of these copolymers are mechanistic. Thus, there is no means for controlling the spacing of the sidechains along the backbone chain and the possibility of the sidechains having irregular sizes. Due to the mechanistic limtations of the prior art methods, i.e., the use of an alpha-olefin terminated prepolymer with acrylonitrile or an acrylate monomer, complicated mixtures of free homopolymers result.

In view of the above considerations, it would be highly desirable to devise a means for preparing graft copolymers wherein the production of complicated mixtures of free homopolymers is minimized and the beneficial properties of the sidechain and backbone polymer are combined in one product.

Moreover, it is recognized and documented in the literature, such as R. Waack et al, Polymer, Vol. 2, pp. 365-366 (1961), and R. Waack et al, J. Org. Chem., Vol. 32, pp. 3395-3399 (1967), that vinyl lithium is one of the slowest anionic polymerization initiators. The slow initiator characteristic of vinyl lithium when used to polymerize styrene produces a polymer having a broad molecular weight distribution due to the ratio of the overall rate of propagation of the styryl anion to that of the vinyl lithium initiation. In other words, the molecular weight distribution of the polymer produced will be determined by the effective reactivity of the initiator compared with that of the propagating anionic polymer species, i.e., vinyl lithium initiator reactivity compared to the styryl anion. Accordingly, following the practice of U.S. Pat. No. 3,235,626, a graft copolymer having sidechains of uniform molecular weight cannot be prepared.

U.S. Pat. Nos. 3,390,206 and 3,514,500 describe processes for terminating free-radical and ionic polymerized polymers with functional groups which are described as capable of copolymerizing with polymerizable monomers. The functionally terminated prepolymers described by these patentees also would be expected to have a broad molecular weight distribution and, therefore, would not be capable of producing a chemically joined, phase separated thermoplastic graft copolymer.

SUMMARY OF THE INVENTION

The present invention relates to thermoplastic graft copolymers comprised of copolymeric backbones containing a plurality of uninterrupted repeating units of the backbone polymer and at least one integrally copolymerized moiety per backbone polymer chain having chemically bonded thereto a substantially linear polymer which forms a copolymerized sidechain to the backbone, wherein each of the polymeric sidechains has substantially the same molecular weight and each polymeric sidechain is chemically bonded to only one backbone polymer.

The graft copolymers of the present invention assume a "T" type structure when only one sidechain is copolymerized into the copolymeric backbone. However, when more than one sidechain is copolymerized into the backbone polymer, the graft copolymer may be characterized as having a comb-type structure illustrated in the following manner:

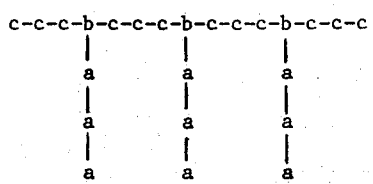

wherein $a$ represents a substantially linear, uniform molecular weight polymer or copolymer having a sufficient molecular weight such that the physical properties of at least one of the substantially linear polymers are manifest; $b$ represents a reacted and polymerized end group chemically bonded to the sidechain $a$, which is integrally polymerized into the backbone polymer, and $c$ is the backbone polymer having uniterrupted segments of sufficient molecular weight such that the physical properties of the polymer are manifest.

The backbone of the graft copolymers of the present invention preferably contains at least about 20 uninterrupted recurring monomeric units in each segment. It has been found that this condition provides the graft copolymer the properties of the polymer. In other words, the presence of segments containing at least about 20 uninterrupted recurring monomeric units provides the graft copolymers with the physical properties attributed to this polymer, such as crystalline melting point (Tm) and structural integrity.

The backbone polymeric segments of the chemically joined, phase separated thermoplastic graft copolymrs of the present invention are derived from copolymerizable monomers, preferably the low molecular weight monomers. These copolymerizable monomers include polycarboxylic acids, their anhydrides and amides, polyisocyanates, organic epoxides, including the thioepoxides, urea-formaldehydes, siloxanes, and ethylenically unsaturated monomers. A particularly preferred group of copolymerizable monomers include the ethylenically-unsaturated monomers, especially the monomeric vinylidene type compounds, i.e., monomers containing at least one vinylidene

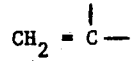

The vinyl type compounds represented by the formula

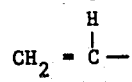

wherein a hydrogen is attached to one of the free valences of the vinylidene group are contemplated as falling within the generic scope of the vinylidene compounds referred to hereinabove.

The copolymerizable monomers useful in the practice of the present invention are not limited by the exemplary classes of compounds mentioned above. The only limitation on the particular monomers to be employed is their capability to copolymerize with the polymerizable end groups of the sidechain prepolymer under free-radical, ionic, condensation, or coordination (Ziegler or Ziegler-Natta catalysis) polymerization reactions. As it will be seen from the description of macromolecular monomers, described hereinbelow, the choice of polymerizable end groups includes any polymerizable compound commercially available. Accordingly, the choice of respective polymerizable end group and copolymerizable monomer can be chosen, based upon relative reactivity ratios under the respective copolymerization reaction conditions suitable for copolymerization reaction. For example, alpha-olefins copolymerize with one another using Ziegler catalysts, and acrylates copolymerize with vinyl chloride, acrylonitrile and other alkyl acrylates. Accordingly, an alpha-olefin terminated macromolecular monomer copolymerizes with ethylene and alpha-olefins using a Ziegler catalyst and an acrylate or methacrylate terminated macromolecular monomer copolymerizes with vinyl chloride, acrylonitrile, acrylates and methacrylates under free-radical conditions in a manner governed by the respective reactivity ratios for the comonomers.

As will be explained hereinafter, the excellent combination of beneficial properties possessed by the graft copolymers of the present invention are attributed to the large segments of uninterrupted copolymeric backbones and the integrally copolymerized linear sidechains of controlled molecular weight and narrow molecular weight distribution.

The term "linear", referred to hereinabove, is being used in its conventional sense, to pertain to a polymeric backbone that is free from cross-linking.

The sidechain polymers having substantially uniform molecular weight are comprised of substantially linear polymers and copolymers produced by anionic polymerization of any anionically polymerizable monomer, as will be described hereinafter. Preferably, the sidechain polymer will be different than the backbone polymer.

It is preferred that at least one segment of the sidechain polymer of the graft copolymers of the present invention have a molecular weight sufficient to manifest the beneficial properties of the respective polymer. In other words, physical properties of the sidechain polymer such as the glass transition temperature (Tg) will be manifest. Generally, as known in the art, the average molecular weight of the segment of the polymeric sidechains necessary to establish the physical properties of the polymer will be from about 5,000 to about 50,000.

In light of the unusual and improved physical properties possessed by the thermoplastic graft copolymers of the present invention, it is believed that the monofunctionally bonded polymeric sidechains having substantially uniform molecular weight form what is known as "domains".

STATEMENT OF THE INVENTION

Briefly, the chemically joined, phase separated thermoplastic graft copolymers of the present invention are prepared by first preparing the sidechains in the form of monofunctional living polymers of substantially uniform molecular weight. The living polymers are thereafter terminated, as by reaction with a halogen-containing compound that also contains a reactive polymerizable group, such as, for example, a polymerizable olefinic or epoxy group, or a compound which contains a reactive site to an anion of the living polymer and a polymerizable moiety which does not preferentially react with the anion, e.g., maleic anhydride.

The monofunctional terminated living polymer chains are then polymerized, together with the backbone monomer, to form a chemically joined, phase separated thermoplastic graft copolymer wherein the polymeric sidechains are integrally polymerized into the backbone polymer.

DESCRIPTION OF THE PREFERRED EMBODIMENTS

The chemically joined, phase separated thermoplastic graft copolymers derived from ethylenically unsaturated monomers as the backbone comonomer generally correspond to the following structural formula:

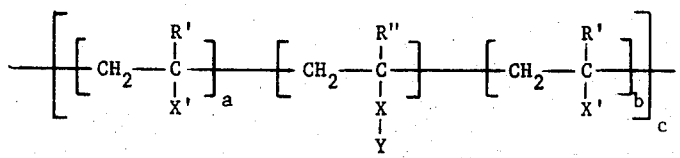

wherein R' and R" are each selected from the group consisting of hydrogen, lower alkyl, cycloalkyl, and aryl radicals; X and X' are each selected from the group consisting of hydrogen, alkylene radicals

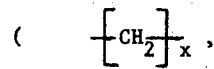

$x$ is a positive integer wherein the terminal methylene group in X' is either hydrogen, lower alkyl, e.g., methyl, halogen, etc., and in the case of X, joins the backbone polymer with the sidechain polymer), a saturated ester

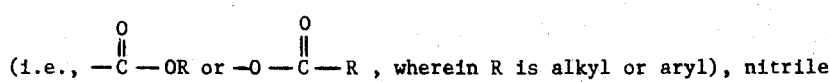

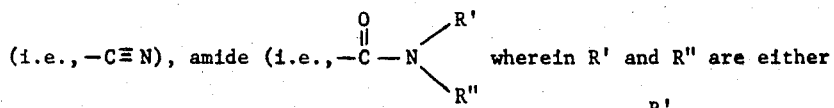

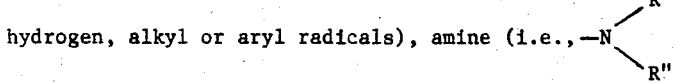

wherein R' and R" are either hydrogen, alkyl or aryl radicals), isocyanate, halogen (i.e., F, Cl, Br or I) and ether (i.e., —O—R, wherein R is either alkyl or aryl radicals); X and X' may be the same or different. However, in the case where X' is an ester, X should be a functional group such as ester, halogen, nitrile, etc., as explained hereinabove with respect to the respective reactivity ratios of the comonomers used to prepare the graft copolymers; Y is a substantially linear polymer or copolymer wherein at least one segment of the polymer has a sufficient molecular weight to manifest the properties of the resepctive polymer, i.e., a molecular weight of from about 5,000 to about 50,000, preferably a molecular weight of from about 10,000 to about 35,000 more preferably 12,000 to about 25,000; the symbols a, b and c are positive integers, with the proviso that a and b are each a value such that the physical properties of the uninterrupted segments in the backbone, e.g., Tm, are manifest, preferably at least about 20; and the symbol c is at least one, but preferably greater than one, e.g., a value such that the molecular weight of the graft copolymer will be up to about 2,000,000.

The formation of the graft copolymers of the present invention may be better understood by reference to the following reactions illustrated by the equations set forth below wherein the invention is illustrated in terms of polystyrene sidechains and polyethylene backbones. It can be seen from these equations that the first reactions involve the preparation of living polymers of polystyrene. The living polymers are thereafter reacted with a molar equivalent of allyl chloride, wherein the reaction takes place at the carbon-chloride bond, rather than at the carbon-carbon double bond. The vinyl terminated polystyrene, referred to herein as the alpha-olefin terminated macromolecular monomer, is than copolymerized with ethylene to produce a graft copolymer of polyethylene, whereby the vinyl moiety of the polystyrene is integrally polymerized into the linear polyethylene backbone.

Alternatively, the living polymer can be reacted with an epoxide such as, for example, ethylene oxide, to produce an alkoxide ion which can then be reacted with the halogen-containing olefin, i.e., allyl chloride, to produce an alpha-olefin terminated macromolecular monomer. This, in essence, places the terminal alpha-olefin farther away from the aromatic ring of the polystyrene and therefore reduces any steric hindering influence that might be exerted by the aromatic ring.

FORMATION OF THE GRAFT COPOLYMER OF ALPHA-OLEFIN TERMINATED POLYSTYRENE SIDECHAIN AND POLYETHYLENE BACKBONE

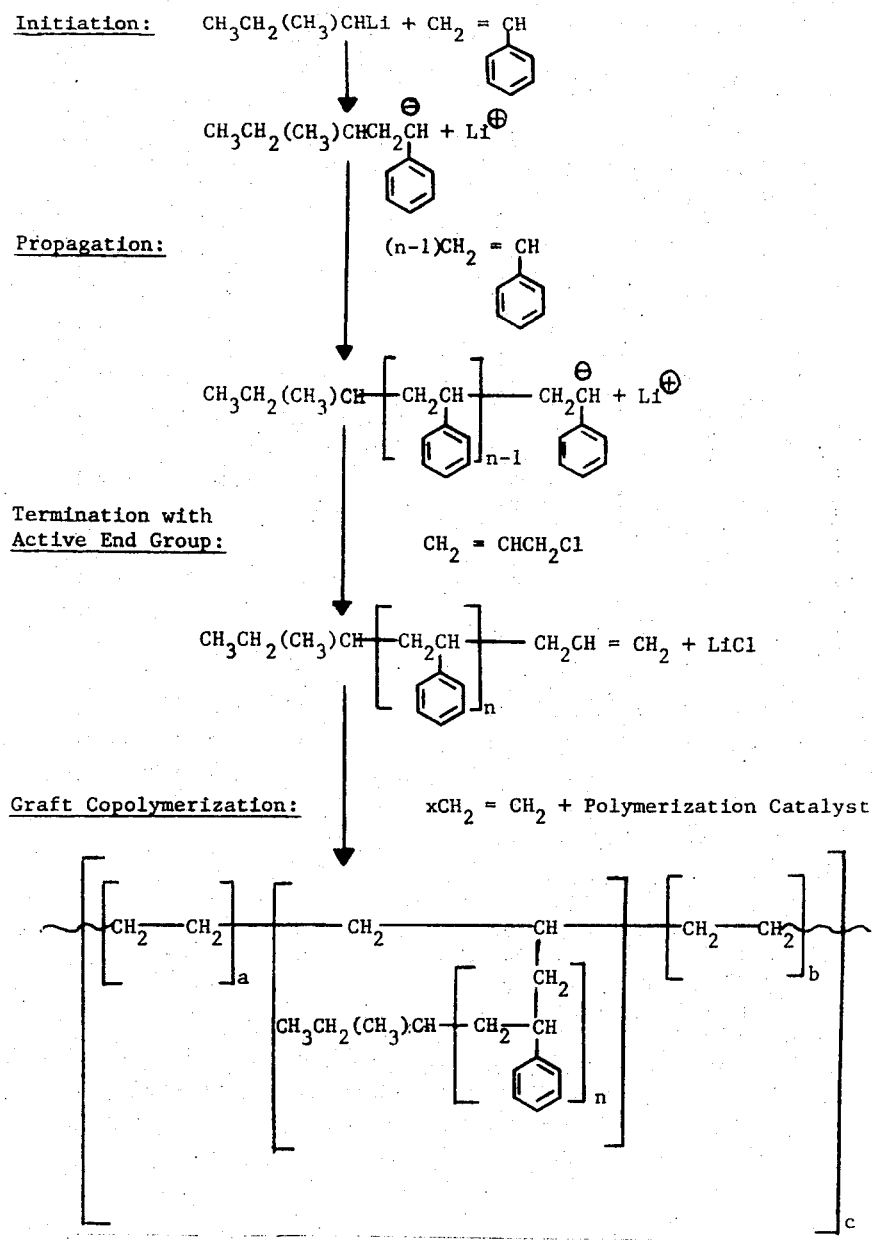

In the equations above, the symbols $a$, $b$, $c$, $n$ and X are positive integers wherein a and b are at least about 20, $n$ has a value of from about 50 to about 500, and $x$ has a value corresponding approximately to the sum of $a$ and $b$.

Preparation of The Living Polymers

The sidechains of the chemically joined, phase separated graft copolymers, above, are preferably prepared by the anionic polymerization of a polymerizable monomer or combination of monomers. In most instances, such monomers are those having an olefinic group, such as the vinyl containing compounds, although the olefinic containing monomers may be used in combination with epoxy or thioepoxy containing compounds. The living polymers are conveniently prepared by contacting the monomer with an alkali metal hydrocarbon or alkoxide salts in the presence of an inert organic diluent which does not participate in or interfere with the polymerization reaction.

Those monomers susceptible to anionic polymerization are well-known and the present invention contemplates the use of all anionically polymerizable monomers. Non-limiting illustrative species include vinyl aromatic compounds, such as styrene, alpha-methylstyrene, vinyl toluene and its isomers; vinyl unsaturated amides such as acrylamide, methacrylamide, N,N-dilower alkyl acrylamides, e.g., N,N-dimethylacrylamide; acenaphthalene; 9-acrylcarbazole; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene. The term "lower" is used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms.

Many other monomers suitable for the preparation of the sideChains by anionic polymerization are those disclosed in *Macromolecular Reviews:* Volume 2, pages 74–83, Interscience Publishers, Inc. (1967), entitled "Monomers Polymerized by Anionic Initiators," the disclosure of which is incorporated herein by reference.

The initiators for these anionic polymerizations are any alkali metal hydrocarbons and alkoxide salts which produce a monofunctional living polymer, i.e., only one end of the polymer contains a reactive anion. Those catalysts found suitable include the hydrocarbons of lithium, sodium or potassium as represented by the formula RMe wherein Me is an alkali metal such as sodium, lithium or potassium and R represents a hydrocarbon radical, for example, an alkyl radical containing up to about 20 carbon atoms or more, and preferably up to about eight carbon atoms, an aryl radical, an alkaryl radical or an aralkyl radical. Illustrative alkali metal hydrocarbons include ethyl sodium, n-propyl sodium, n-butyl potassium, n-octyl potassium, phenyl sodium, ethyl lithium, sec-butyl lithium, t-butyl lithium and 2-ethylhexy lithium. Sec-butyl lithium is the preferred initiator because it has a fast initiation which is important in preparing polymers of narrow molecular weight distribution. It is preferred to employ the alkali metal salts of tertiary alcohols, such as potassium t-butyl alkoxylate, when polymerizing monomers having a nitrile or carbonyl functional group.

The alkali metal hydrocarbons and alkoxylates are either available commercially or may be prepared by known methods, such as by the reaction of a halohydrocarbon, halobenzene or alcohol and the appropriate alkali metal.

An inert solvent generally is used to facilitate heat transfer and adequate mixing of initiator and monomer. Hydrocarbons and ethers are the preferred solvents. Solvents useful in the anionic polymerization process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran, dioxane, anisole, tetrahydropyran, diglyme, glyme, etc. The rates of polymerization are faster in the ether solvents than in the hydrocarbon solvents, and small amounts of ether in the hydrocarbon solvent increase the rates of polymerization.

The amount of initiator is an important factor in anionic polymerization because it determines the molecular weight of the living polymer. If a small proportion of initiator is used, with respect to the amount of monomer, the molecular weight of the living polymer will be larger than if a large proportion of initiator is used. Generally, it is advisable to add initiator dropwise to the monomer (when that is the selected order of addition) until the persistence of the characteristic color of the organic anion, then add the calculated amount of initiator for the molecular weight desired. The preliminary dropwise addition serves to destroy contaminants and thus permits better control of the polymerization.

To prepare a polymer of narrow molecular weight distribution, it is generally preferred to introduce all of the reactive species into the system at the same time. By this technique, polymer growth by consecutive addition of monomer takes place at the same rate to an active terminal group, without chain transfer or termination reaction. When this is accomplished, the molecular weight of the polymer is controlled by the ratio of monomer to initiator, as seen from the following representation:

$$\frac{\text{Molecular Weight}}{\text{Of Living Polymer}} = \frac{\text{Moles of Monomer}}{\text{Moles of Initiator}} \times \frac{\text{Molecular Weight}}{\text{Of Monomer}}$$

As it can be seen from the above formula, high concentrations of initiator leads to the formation of low molecular weight polymers, whereas, low concentrations of initiator leads to the production of high molecular weight polymers.

The concentration of the monomer charged to the reaction vessel can vary widely, and is limited by the ability of the reaction equipment to dissipate the heat of polymerization and to properly mix the resulting viscous solutions of the living polymer. Concentrations of monomer as high as 50% by weight or higher based on the weight of the reaction mixture can be used. However, the preferred monomer concentration is from about 5% to about 25% in order to achieve adequate mixing.

As can be seen from the formula above and the foregoing limitations on the concentration of the monomer, the initiator concentration is critical, but may be varied according to the desired molecular weight of the living polymer and the relative concentration of the monomer. Generally, the initiator concentration can range from about 0.001 to about 0.1 mole of active alkali metal per mole of monomer, or higher. Preferably, the concentration of the initiator will be from about 0.01 to about 0.004 mole of active alkali metal per mole of monomer.

The temperature of the polymerization will depend on the monomer. Generally, the reaction can be carried out at temperatures ranging from about −100°C up to about 100°C. When using aliphatic and hydrocarbon diluents, the preferred temperature range is from about −10°C to about 100°C. With ethers as the solvent, the preferred temperature range is from about −100°C to about 100°C. The polymerization of the styrene is generally carried out at slightly above room temperature; the polymerization of alpha-methylstyrene preferably is carried out at lower temperatures, e.g., −80°C.

The preparation of the living polymer can be carried out by adding a solution of the alkali metal hydrocarbon initiator in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. As pointed out above, however, it is important to add all of the reactive ingredients together rapidly to insure the formation of a uniform molecular weight distribution of the polymer.

The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerizations are generally carried out in dry equipment, using anhydrous reactants, and under an inert gas atmosphere, such as nitrogen, helium, argon, methane, and the like.

The above-described living polymers are susceptible to further reactions including further polymerization. Thus, if additional monomer, such as styrene, is added to the living polymer, the polymerization is renewed and the chain grows until no more monomeric styrene remains. Alternatively, if another different anionically polymerizable monomer is added, such as butadiene or ethylene oxide, the above-described living polymer initiates the polymerization ot the butadiene or ethylene oxide and the ultimate living polymer which results consists of a polystyrene segment and a polybutadiene or polyoxyethylene segment.

A poly(styrene-ethylene) block copolymer can be prepared by contacting living polystyrene with ethylene in the presence of a compound of a transition metal of Group V-VIII in the periodic table, e.g., titanium tetrachloride. This technique is also applicable to the alpha-olefins, such as propylene. The resulting copolymer is still a living polymer and can be teminated by the methods in accordance to the practice of the present invention.

As noted above, the living polymers employed in the present invention are characterized by relatively uniform molecular weight, i.e., the distribution of molecular weights of the mixture of living polymers produced is quite narrow. This is in marked contrast to the typical polymer, where the molecular weight distribution is quite broad. The difference in molecular weight distribution is particularly evident from an analysis of the gel permeation chromatogram of commercial polystyrene (DOW 666u) prepared by free-radical polymerization and polystyrene produced by the anionic polymerization process utilized in accordance with the practice of the present invention.

Production Of The Macromolecular Monomers By Termination Of The Living Polymers

The living polymers herein are terminated by reaction with a halogen-containing compound which also contains a polymerizable moiety, such as an olefinic group or an epoxy or thioepoxy group. Suitable halogen-containing terminating agents include: the vinyl haloalkyl ethers wherein the alkyl groups contain six or fewer carbon atoms such as methyl, ethyl, propyl, butyl, isobutyl, sec-butyl, amyl or hexyl; vinyl esters or haloalkanoic acids wherein the alkanoic acid contains six or fewer carbon atoms, such as acetic, propanoic butyric, pentanoic, or hexanoic acid; olefinic halides having six or fewer carbon atoms such as vinyl halide, allyl halide, methallyl halide, 6-halo-1-hexene, etc.; halides of dienes such as 2-halomethyl-1,3-butadiene, epihalohydrins, acrylyl and methacrylyl halides, haloalkylmaleic anhydrides; haloalkylmaleate esters; vinyl haloalkylsilanes; vinyl haloaryls; and vinyl haloalkaryls, such as vinyl benzyl chloride (VBC); haloalkyl norbornenes, such as bromomethyl norbornene, bromonorbornane, and epoxy compounds such as ethylene or propylene oxide. The halo group may be chloro, fluoro, bromo, or iodo; preferably, it is chloro. Anhydrides of compounds having an olefinic group or an epoxy or thioepoxy group may also be employed, such as maleic anhydride, acrylic or methacrylic anhydride. The following equations illustrate the typical termination reactions in accordance with the practice of the present invention:

Living Polymer:

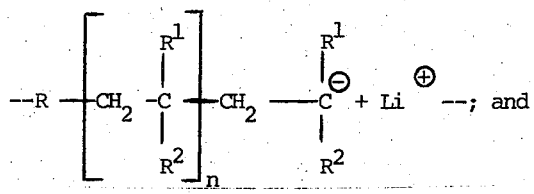

Terminating Agents:

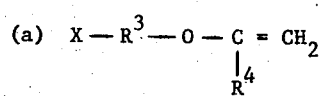

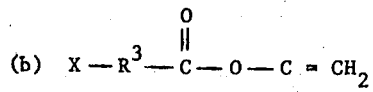

Terminating Agents:
(c) 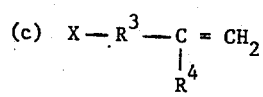
(d) 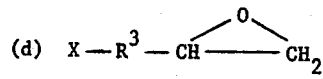
(e) 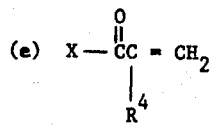
(f) 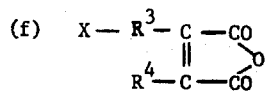
(g) 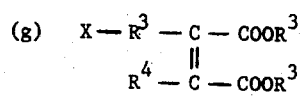
(h) 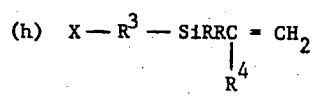
(i) 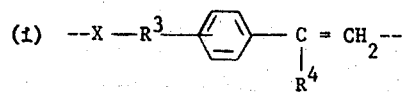
(j) 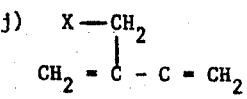
(a) 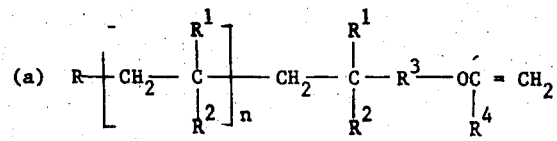
(b) 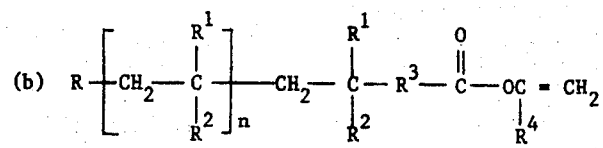
(c) 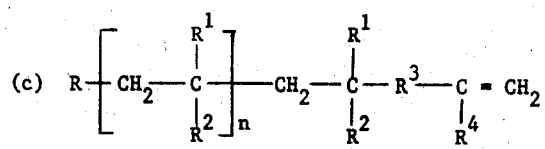
(d) 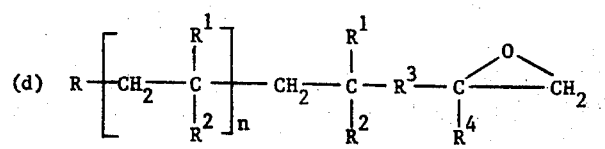

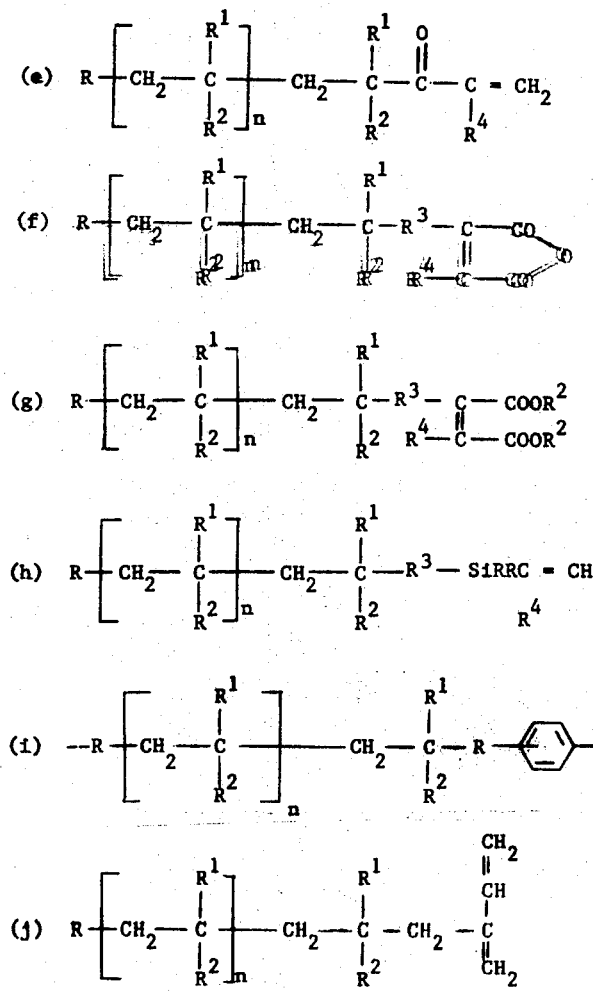

In the above equations, R, $R^1$, $R^2$, $R^3$ and $R^4$ are each selected from the group consisting of hydrogen and lower alkyl, and aryl radicals. Preferably, R will be lower alkyl, such as sec-butyl; $R^1$ will be either hydrogen or methyl; $R^2$ will be phenyl; $R^3$ will be hydrogen or lower alkylene radical; and $R^4$ will be either hydrogen or lower alkyl radical. The symbol n is a positive integer such that the properties of the polymer are manifest, i.e., a value such that the polymer will have a molecular weight in the range of from about 5,000 to about 50,000, preferably a molecular weight in the range of from about 10,000 to about 35,000, more preferably a molecular weight in the range of from about 12,000 to about 25,000.

Termination of the living polymer by any of the above types of terminating agents is accomplished simply by adding the terminating agent to the solution of living polymer at the temperature at which the living polymer is prepared. Reaction is immediate and the yield is theoretical. A slight molar excess of the terminating agent, with respect to the amount of catalyst, may be used although the reaction proceeds on a mole-for-mole basis.

The termination may be conducted in any suitable inert solvent. Generally, it is advisable to utilize the same solvent system employed in the preparation of the living polymer. A preferred embodiment of the invention comprises conducting the termination reaction in a hydrocarbon solvent rather than the polar ether type solvents such as tetrahydrofuran. It has been found that the hydrocarbon solvents such as the aromatic hydrocarbons, saturated aliphatic and cycloaliphatic hydrocarbons cause several differences in the reaction conditions and the resulting product. For example, the termination reaction can be conducted at higher temperatures with hydrocarbon solvents as opposed to the ether solvents.

In some instances, because of the nature of the living polymer and the monomer from which it is prepared, or because of the nature of the terminating agent, certain deleterious side reactions occur which result in an impure product. For example, the carbanion of some living polymers have a tendency to react with functional groups or any active hydrogens of the terminating agent. Thus, for example, acryly or methacrylyl chloride while they act as terminating agents because of the presence of the chlorine atom in their structure, they also provide a carbonyl group in the terminated polymer chain, and this carbonyl group may provide a center for attack by a second highly reactive living polymer. The resulting polymer either has twice the expected molecular weight or contains some chlorine, indicating that some of the living polymer has been terminated by reaction with a second living polymer or with one of the active hydrocarbons of the acrylyl or methacrylyl chloride.

It has been discovered that one means for overcoming the foregoing problem is to render the reactive carbanion less susceptible to reaction with the functional groups or any active hydrogens of a terminating agent. A preferred method to render the living polymer less susceptible to the adverse reaction is to "cap" the highly reactive living polymer with a lesser reactive reactant. Example of some preferred capping agents include the lower alkylene oxides, i.e., one having eight or fewer carbon atoms such as ethylene and propylene oxide; diphenyl ethylene, etc. The capping reaction yields a product which still is a living polymer, but yields a purer product when subsequently reacted with a terminating agent containing a functional group or active hydrogen.

It has been found that diphenyl ethylene is an excellent "capping agent" when terminating agents such as, for example, vinyl chloroalkanoates are employed.

A particularly preferred capping agent is an alkylene oxide, such as ethylene oxide. It reacts with the living polymer, with the destruction of its oxirane ring. The following is a typical illustration of the "capping reaction" which shows the reaction of ethylene oxide as a capping agent with a living polymer prepared by the polymerization of styrene with sec-butyl lithium as the initiator:

group, including the following typical compounds: acrylyl chloride, methacrylyl chloride, vinyl-2-chloroethyl ether, vinyl chloroacetate, chloromethylmaleic anhydride and its esters, maleic anhydride (yields half ester of maleic acid following protonation with water), allyl and methallyl chloride and vinylbenzyl chloride.

The reaction of the above-described capped living polymers with either acrylyl or methacrylyl chloride can be represented by the following reaction:

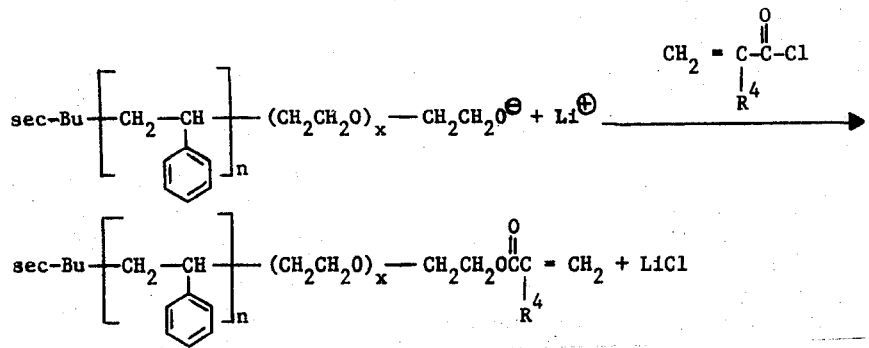

wherein $n$ is a positive integer of about at least 50, $x$ is either 0 or a positive integer and $R^4$ is either hydrogen or methyl.

When an epihalohydrin is used as the terminating reagent, the resulting polymer contains a terminal epoxy group. This terminal epoxy may be used as the polymerizable group itself, such as in the preparation of a polyisobutylene or a polypropylene oxide backbone graft copolymer or may be converted to various other useful polymerizable end groups by any one of several known reactions.

As one embodiment of the invention, the terminated

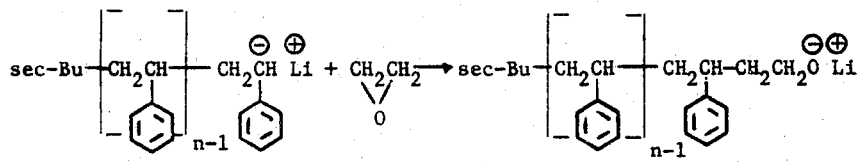

The capping reaction is carried out quite simply, as in the case of the terminating reaction, by adding the capping reactant to the living polymer at polymerization temperatures. The reaction occurs immediately. As in the case of the termination reaction, a slight molar excess of the capping reactant with respect to the amount of initiator may be used. The reaction occurs on a mole-for-mole basis.

It will be understood that when a large molar excess of alkylene oxide is reacted with the living polymer, a living polymer having two polymeric blocks is produced. A typical example with polystyrene segments and polyoxyalkylene segments is illustrated as follows:

polymer containing an epoxy or thioepoxy end group may be reacted with a polymerizable carboxylic acid halide, such as acrylic, methacrylic, or maleic acid halide, to produce a beta-hydroxyalkyl acrylate, methacrylate or maleate ester as the polymerizable terminal moiety of the substantially uniform molecular weight polymer. These same polymerizable esters may be prepared from the terminal epoxy polymer by first converting the epoxy group to the corresponding glycol by warming the polymer with aqueous sodium hydroxide, followed by conventional esterification of the glycol end group with the appropriate polymerizable carboxylic acid, or acid halide.

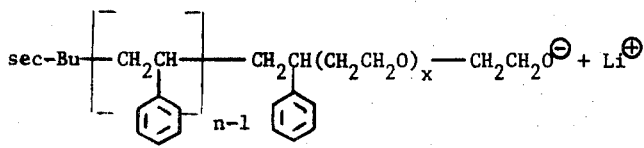

wherein $x$ is a positive integer.

Either of the above-described ethylene oxide "capped" polymers can be conveniently terminated with a compound containing a moiety reactive with the anion of the capped polymer and a polymerizable end The resulting glycol obtained by the aqueous hydrolysis of the epoxy group in the presence of a base may be converted to a copolymer by reaction with a high molecular weight dicarboxylic acid which may be prepared, e.g., by the polymerization of a glycol or diamine with a molar excess of phthalic anhydride, maleic anhydride, succinic anhydride, or the like. These reactions can be modified to obtain a polystyrene block and a polyamide block (Nylon). The glycol terminated polymer may also be reacted with a diisocyanate to form a polyurethane. The diisocyanate may be e.g., the reaction product of a polyethylene glycol having an average molecular weight of 400 with a molar excess of phenylene diisocyanate.

In another embodiment of the invention, an organic epoxide is copolymerized with a terminated polymer containing an epoxy or thioepoxy end group. The graft copolymer which results is characterized by a backbone having uninterrupted segments of at least about 20, and preferablyat least about 30, recurring units of the organic epoxide. Preferred organic epoxides include ethylene oxide propylene oxide, butylene oxide, hexylene oxide, cyclohexene epoxide and styrene oxide, i.e., those having 8 or fewer carbon atoms.

When a haloalkylmaleic anhydride or haloalkylmaleate ester is used as the terminating agent, the resulting terminal groups can be converted by hydrolysis to carboxyl groups. The resulting dicarboxylic polymer may be copolymerized with glycols or diamines to form polyesters and polyamides having a graft copolymer structure.

If it is desired to isolate and further purify the macromolecular monomer from the solvent from which it was prepared, any of the known techniques used by those skilled in the art in recovering polymeric materials may be used. These techniques include: ( ) solvent-nonsolvent precipitation; (2) evaporation of solvent in an aqueous media; and (3) evaporation of solvent, such as by vacuum roll drying, spray drying, freeze drying; and (4) steam jet coagulation.

The isolation and recovery of the macromolecular monomer is not a critical feature of the invention. In fact, the macromolecular monomer need not be recovered at all. Stated otherwise, the macromolecular monomer, once formed, can be charged with the suitable monomer and polymerization catalyst to conduct the graft copolymerization in the same system as the macromolecular monomer was prepared, providing the solvent and materials in the macromolecular monomer preparation reactor do not poison the catalyst or act in a deleterious manner to the graft copolymerization process. Thus, a judicious selection of the solvent and purification of the reactor system in the preparation of the macromolecular monomer can ultimately result in a large savings in the production of the graft copolymers of the present invention.

As pointed out above, the macromolecular monomers, which ultimately become the sidechains of the graft copolymers by being integrally polymerized into the backbone polymer, must have a narrow molecular weight distribution. Methods for determining the molecular weight distribution of polymers such as the macromolecular monomers are known in the art. Using these known methods, the weight average molecular weight ($\overline{M}w$) and the number average molecular weight ($\overline{M}n$) can be ascertained, and the molecular weight distribution ($\overline{M}w/\overline{M}n$) properties the macromolecular monomer can be determined. The macromolecular monomers must have nearly a Poisson molecular weight distribution or be virtually monodisperse in order to have the highest degree of functionality. Preferably, the ratio of $\overline{M}w/\overline{M}n$ of the novel macromolecular monomers will be less than about 1.1. The macromolecular monomers of the present invention possess the aforementioned narrow molecular weight distribution and purity due to the method of their preparation, described hereinabove. Thus, it is important that the sequence of steps in preparing the macromolecular monomers be adhered to in order to produce the optimum results in beneficial properites in the graft copolymers.

GRAFT COPOLYMERIZATION

Prior to the invention herein, graft copolymers were prepared by synthesizing a linear "backbone," then grafting onto this backbone, growing polymeric or preformed polymeric chains. These methods generally require elaborate equipment and produce a mixture of products having inferior properties unless further purified. Because of the additional processing conditions and the use of special equipment, these processes are not economically feasible.

Although some of the prior art graft copolymers, such as those described in U.S. Pat. Nos. 3,627,837 3,634,548 and 3,644,584 and British Pat. Nos. 873,656 and 1,144,151 resemble the graft copolymers of the present invention. Generally, the present graft copolymers are different compositions, not only because they are prepared by significantly different processes, but because the pendant polymeric chains of the graft copolymers of this invention are of relatively uniform, minimum length, and are each an integral part of the backbone. Furthermore, the backbone of the graft copolymers of the present invention contain polymeric segments of certain minimum length. Thus, the present graft copolymers differ structurally because the macromolecular monomer is interposed between polymeric segments of the backbone polymer, rather than being merely attached to the backbone polymer in a random manner. These characteristics contribute materially to the advantageous properties which inhere in these novel graft copolymers.

The graft copolymers of the present invention are prepared by first synthesizing the pendant polymeric chains (the polymerizable terminated living polymers) then copolymerizing the terminal portions of the polymeric chains with the second monomer during the formation of the backbone polymer.

In accordance with the practice of the present invention, the substantially pure macromolecular monomers of high controlled molecular weight and molecular weight distribution have an appropriate reactive end group suitable for any mechanism of copolymerization, e.g., free-radical, cationic, anionic, Ziegler catalysis, and condensation. Thus, the reactive end group is selected for easy copolymerization with low cost monomers by conventional means and within existing polymerization equipment.

The copolymerization with the macromolecular monomers and the second reactive monomer is a graftlike structure where the pendant chain is a polymer whose molecular weight and distribution are predetermined by independent synthesis. The distribution of the sidechain polymer along the backbone is controlled by the reactivity ratios of the comonomers.

Since the reactive end group of the macromolecular monomer is copolymerized with the second monomer, it is an integral part of the backbone polymer. Thus, the polymerizable end group of the macromolecular monomer is interposed between large segments of the backbone polymer.

The present invention provides a means for controlling the structure of the graft copolymer. More specifically, the control of the structure of the graft copolymer can be accomplished by any one or all of the following means: (1) by determining the reactivity ratio of the macromolecular monomer and a second monomer during the copolymerization reaction, a pure graft polymer free from contamination by homopolymers can be prepared; (2) by controlling the monomer addition rates during the copolymerization of a macromolecular monomer and a second monomer, the distance between the sidechains in the polymer structure can be controlled; and (3) the size of the graft chain can be predetermined and controlled in the anionic polymerization step of the preparation of the macromolecular monomer.

It will be apparent to those skilled in the art that by the proper selection of terminating agents, all mechanisms of copolymerization may be employed in preparing the controlled phase separated graft copolymers.

As alluded to hereinabove, the chemically joined, phase separated graft copolymers of the present invention are preferably copolymerized with any ethylenically-unsaturated monomer including the vinylidene type compounds containing at least one vinylidene

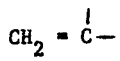

group and preferably the vinyl-type compounds containing the characteristic $CH_2 = CH$—group wherein hydrogen is attached to one of the free valences of the vinylidene group. The copolymerization, as pointed out above, is only dependent upon the relative reactivity ratios of the terminal group and the comonomer.

Examples of some of the preferred ethylenically-unsaturated compounds used as the comonomers include the acrylic acids, their esters, amides and nitriles including acrylic acid, methacrylic acid, the alkyl esters of acrylic and methacrylic acid, acrylonitrile, methacrylonitrile, acrylamide, methacrylamide, N,N-dimethacrylamide (NNDMA); the vinyl halides such as vinyl chloride, and vinylidene chloride; the vinyl cyanides such as vinylidene cyanide (1,1-dicyanoethylene); the vinyl esters of the fatty acids such as vinyl acetate, vinyl propionate and vinyl chloroacetate, etc.; and the vinylidene containing dicarboxylic anhydrides, acids and esters, fumaric acid and esters, maleic anhydrides, acids and esters thereof.

A particularly important class of vinylidene type compounds useful as comonomers with the alpha-olefin and styrene terminated macromolecular monomers include the vinyl olefinic hydrocarbons, such as ethylene, propylene, 1-butene, isobutylene, 1-pentene, 1-hexene, styrene, 3-methyl-1-butene, 4-methyl-1-hexene and cyclohexene. Also, there may be used as the comonomers the polyolefinic materials containing at least one vinylidene group such as the butadiene-1,3 hydrocarbons including butadiene, isoprene, piperylene and other conjugated dienes, as well as other conjugated and non-conjugated polyolefinic monomers including divinyl benzene, the diacrylate type esters of methylene, ethylene, polyethylene glycols, and polyallyl sucrose.

The most preferred ethylenically unsaturated comonomers are the commercially available and widely used monomers such as methyl acrylate, butyl acrylate, 2-ethyl hexyl acrylate, methyl methacrylate, vinyl chloride, vinylidene chloride, vinylidene cyanide, acrylonitrile; and the hydrocarbon monomers such as ethylene, propylene, styrene; and the conjugated dienes such as butadiene and isoprene.

In addition to the hereinafter described ethylenically unsaturated comonomers useful in the practice of the invention, there are included the comonomers capable of copolymerizing by condensation or step-reaction polymerization conditions with the polymerizable macromolecular monomers of the invention. In this connection, the polymerizable macromolecular monomers will contain the appropriate terminal groups necessary to facilitate the condensation reaction. For example, living polymers terminated with epichlorohydrin will contain an epoxy terminal group which converts to a

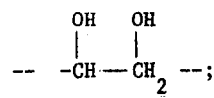

group upon saponification. This vicinal hydroxy group is capable of copolymerizing with polybasic acids and anhydrides to form polyesters, such as adipic acid, phthalic anhydride, maleic anhydride, succinic anhydride, trimellitic anhydride, etc.; aldehydes to form polyacetals, such as polyformaldehyde, ureaformaldehydes, acetaldehydes, etc.; polyisocyanates and polyisocyanate prepolymers to form polyurethanes; and siloxanes to form polysiloxanes. The living polymers terminated with halomaleic anhydride or halomaleate ester may be converted to terminal carboxyl groups by conventional hydrolysis. The resulting dicarboxylic terminated polymer can be copolymerized with glycols to form polyesters or with diamines to form polyamides having a graft copolymer structure. Alternatively, the maleic anhydride or ester terminal group or the polymer can be used in the condensation polymerization with the glycols or diamines. The vicinal hydroxy or carboxyl terminated polymers of the invention can also be copolymerized with epoxy compounds, and the imine compounds, such as ethyleneimine.

The placement of the sidechain in the polymer backbone is dependent on the terminal group of the macromolecular monomer and the reactivity of the comonomer.

The macromolecular monomers of the invention are stable in storage and do not significantly homopolymerize. Furthermore, the macromolecular monomer copolymerizes through the terminal double bond or reactive end group and is not incorporated into the polymeric backbone by grafting reactions to the polymer of the macromolecular monomer segment.

As indicated hereinabove, the macromolecular monomers of the invention copolymerize with commercial vinyl monomers in a predictable manner as determined by relative reactivity ratios. It can be shown that the instantaneous copolymer equation:

$$(1) \quad \frac{dM_1}{dM_2} = \left[\frac{M_1}{M_2}\right] \left[\frac{r_1 M_1/M_2 + 1}{\frac{M_1}{M_2} + r_2}\right]$$

simply reduces to the approximation:

$$dM_1/dM_2 \sim M_1/r_2 M_2 \qquad (2)$$

when $M_1$ is in very low molar concentrations. Thus, the macromolecular monomer ($M_1$) copolymerizations with other monomers ($m_2$) are described only by $r_2$ values and monomer feed compositions. Rearrangement of equation (2) gives:

$$r_2 = dM_2/M_2/dM_1/M_1 = \% \text{ Conversion } M_2/\% \text{ Conversion } M_1 \qquad (3)$$

The reactivity ratio, $r_2$, can be estimated from a relatively low conversion sample of a single copolymerization experiment. The validity of this concept of a predictable and controllable reactivity of the macromolecular monomer can thereby be established. It has been shown that the reactivity of commercial monomers with the macromolecular monomers of the present invention with various end groups correlate with available literature values for reactivity ratios of $r_2$.

The method of the present invention permits the utilization of all types of polymerizable monomers for incorporation into backbone polymers, and makes it possible for the first time to design and build graft copolymers of controlled molecular structure, and of backbone and graft segments with different properties, such as hydrophobic and hydrophilic segments, crystalline and amorphous segments, polar and non-polar segments, segments with widely different glass transition temperatures, whereas prior work on SDS terblock copolymers had been limited to the incompatibility of glassy polystyrene blocks with rubbery polydiene blocks.

The copolymerization of the polymerizable macromolecular monomers with the comonomers may be conducted in a wide range of proportions. Generally speaking, a sufficient amount of the macromolecular monomer should be present to provide the chemically joining of at least one of the uniform molecular weight sidechain polymers to each backbone polymer, so that a noticeable effect on the properties of the graft copolymeric properties can be obtained. Since the molecular weight of the polymerizable macromolecular monomer generally exceeds that of the polymerizable comonomers, a relatively small amount of the polymerizable macromolecular monomer can be employed. However, the chemically joined, phase separated thermoplastic graft copolymers may be prepared by copolymerizing a mixture containing up to about 95 percent by weight, or more, of the polymerizable macromolecular monomers of this invention, although mixtures containing up to about 60% by weight of the polymerizable macromolecular monomer are preferred. Stated otherwise, the resinous thermoplastic chemically joined, phase separated graft copolymer of the invention is comprised of (1) from 1 percent to about 95 percent by weight of the polymerizable macromolecular monomer having a narrow molecular weight distribution (i.e., a $\overline{M}w/\overline{M}n$ of less than about 1.1), and (2) from 99 percent to about 5 percent by weight of a copolymerizable comonomer defined hereinabove.

The polymerizable macromolecular monomers copolymerize with the hereinabove referred to comonomers in bulk, in solution, in aqueous suspension and in aqueous emulsion systems suitable for the particular polymerizable macromolecular monomer, its end group and the copolymer employed. If a catalyst is employed, the polymerization environment suitable for the catalyst should be employed. For example, oil- or solvent-soluble peroxides such as benzoyl peroxides, are generally effective when the polymerizable macromolecular monomer is copolymerized with an ethylenically unsaturated comonomer in bulk, in solution in an organic solvent such as benzene, cyclohexane, hexane, toluene, xylene, etc., or in aqueous suspension. Water-soluble peroxides such as sodium, potassium, lithium and ammonium persulfates, etc. are useful in aqueous suspension and emulsion systems. In the copolymerization of many of the polymerizable macromolecular monomers, such as those with an ethylenically-unsaturated end group and a polystyrene, polyisoprene or polybutadiene repeating unit, an emulsifier or dispersing agent may be employed in aqueous suspension systems. In these systems, particular advantage can be achieved by dissolving the water-insoluble polymerizable macromolecular monomer in a small amount of a suitable solvent, such as hydrocarbon. By this novel technique, the comonomer copolymerizes with the polymerizable macromolecular monomer in the solvent, in an aqueous system surrounding the solvent-polymer system. Of course, the polymerization catalyst is chosen such that it will be soluble in the organic phase of the polymerization system.

As previously stated, various different catalyst systems can be employed in the present invention for the copolymerization process. It will be apparent to those skilled in the art that the particular catalyst system used in the copolymerization will vary, depending on the monomer feed and the particular end group on the macromolecular monomer. For example, when using a macromolecular monomer having a vinyl acetate end group, best results are generally obtained by employing free-radical catalyst systems. On the other hand, copolymerization utilizing isobutylene monomer feed with either an allyl, methallyl or epoxy terminated macromolecular monomer, best results are accomplished by utilizing the cationic polymerization techniques. Since the particular polymerizable end group on the macromolecular monomer will depend on the comonomer feed employed because of the relative reactivity ratios, the polymerization mechanism commonly employed for the particular comonomer will be used. For example, ethylene polymerizes under free-radical, cationic and coordination polymerization conditions; propylene and higher alpha-olefins only polymerize under coordination polymerization conditions; isobutylene only polymerizes under cationic polymerization conditions; the dienes polymerize by free-radical anionic and coordination polymerization conditions; styrene polymerizes under free-radical, cationic, anionic and coordination conditions; vinyl chloride polymerizes under free-radical and coordination polymerization conditions; vinylidene chloride polymerizes under free-radical polymerization conditions; vinyl fluoride polymerizes under free-radical conditions; tetrafluoroethylene polymerizes under free-radical and coordination polymerization conditions; vinyl ethers polymerize under cationic and coordination polymerization conditions; vinyl esters polymerize under free-radical polymerization conditions; acrylic and methacrylic esters polymerize under free-radical, anionic and coordination polymerization conditions; and acrylonitrile polymerizes under free-radical, anionic and coordination polymerization conditions.

It will be understood by those skilled in the art that the solvent, reaction conditions and feed rate will be partially dependent upon the type of catalyst system utilized in the copolymerization process. One of the considerations, of course, will be that the macromolecular monomer be dissolved in the solvent system utilized. It is not necessary, however, for the monomer feed to be soluble in the solvent system. Generally, under these conditions during the formation of the copolymer, the graft copolymer will precipitate out of the solvent wherein it can be recovered by techniques known in the polymer art.

The temperature and pressure conditions during the copolymerization process will vary according to the type of catalyst system utilized. Thus, in the production of low density polyolefin backbones under free-radical conditions, extremely high pressures will be employed. On the other hand, the high density substantially linear polyolefin backbone polymers produced by the coordination type catalyst generally will be prepared under moderately low pressures.

When preparing graft copolymers having a polyolefin backbone of ethylene or propylene or copolymers of ethylene and propylene together with a macromolecular monomer, it is preferred to employ a coordination catalyst known in the art as the Ziegler catalyst and Natta catalysts (the latter being commonly used for polypropylene). That is, materials advanced by Professor-Dr. Karl Ziegler of the Max Planck Institute of Mulheim, Ruhr, Germany, and Dr. Giulio Natta of Milan, Italy. Some of these catalysts are disclosed in Belgian Pat. No. 533,362, issued May 16, 1955, and U.S. Pat. Nos. 3,113,115 and 3,257,332 to Ziegler et al. These catalysts are prepared by the interaction of a compound of transition metals of group IV–VIII in the periodic table, the catalyst, and an organometallic compound derived from grup I-III metals, as co-catalyst. The latter are compounds such as metal hydrides and alkyls capable of giving rise to hydride ions of carbanions, such as trialkyl aluminum. Compounds of the transition elements have a structure with incomplete d-shells and in the lower valence states, can associate with the metal alkyls to form complexes with highly polarized bonds. These elements hereinabove referred to as the catalysts are preferably titanium, chromium, vanadium, and zirconium. They yield the best Ziegler catalysts by reaction of their compounds with metal alkyls.

As previously stated, the solvent system utilized will most conveniently be the solvent employed in the preparation of the macromolecular monomer. Solvents useful for the polystyrene macromolecular monomers are those which dissolve polystyrene. Typical solvents for polystyrene include cyclohexane, benzene, toluene, xylene, decalin, tetralin, etc.

The copolymerization reaction may be conducted at any suitable temperature, depending on the particular catalyst, macromolecular monomer, monomer feed, resulting graft copolymer and solvent used. Generally, the graft copolymerization will be conducted at a temperature of from about 10°C to about 500°C, preferably from about 20°C to about 100°C.

The graft copolymerization reaction is preferably conducted by placing a predetermined amount of the macromolecular monomer dissolved in the appropriate solvent in the reactor. The polymerization catalyst and monomer are thereafter fed into the solvent system to produce the graft copolymer.

It is generally desirable to provide a graft copolymer having at least about 2 percent macromolecular monomer incorporated in the backbone polymeric material, however, satisfactory results can be obtained with up to about 40 percent by weight macromolecular monomer incorporation. Preferably, the graft copolymers of the present invention will have about 5 percent to about 20 percent by weight incorporation of the macromolecular monomer into the backbone polymeric material to obtain the optimum physical properties of both the sidechain polymer and the backbone polymer. However, graft copolymers having up to about 95 percent by weight of the macromolecular monomers incorporated therein may be prepared and are contemplated within the scope of the invention.

The means for providing the proper amount of incorporation of the macromolecular monomer can be determined simply by adding the appropriate weighed macromolecular monomer used in the copolymerization process. For example, if a graft copolymer having 10 percent by weight incorporation of the macromolecular monomer into the backbone polymer is desired, one simply employs 10 parts by weight of the macromolecular monomer for each 90 parts by weight of the monomer feed.

Following the procedures outlined above, graft copolymers having unique combinations of properties are produced. These unique combinations of properties are made possible by the novel process herein which forces the compatibility of otherwise incompatible polymeric segments. These incompatible segments segregate into phases of their own kind.

The chemically joined, phase separated graft copolymers of the invention microscopically possess a controlled dispersion of the macromolecular sidechain in one phase (domain) within the backbone polymer phase (matrix). Because all of the macromolecular monomer sidechain domains are an integral part or interposed between large segments of the backbone polymer, the resulting graft copolymers will have the properties of a cross-linked polymer, if there is a large difference in the Tg or Tm of the backbone and sidechain segments. This is true only up to the temperature required to break the thermodynamic crosslink of the dispersed phase. In essence, a physically cross-linked (as opposed to chemical cross-linked) type polymer can be made that is reprocessable and whose properties are established by simple cooling, rather than vulcanization or chemical cross-linking.

The graft copolymers of the present invention are differentiated from the macroscropic opaque and weak blends of imcompatible polymers of the prior art. The graft copolymers of this invention contain separate phases which are chemically joined and the dispersion of one segment into the matrix polymer is on a microscopic level and below the wavelength of light of the matrix polymer. The graft copolymers herein are, therefore, transparent, tough, and truly thermoplastic.

An illustrative example of the present invention includes combining the advantageous properties of polystyrene with the advantageous properties of polyethylene, although these two polymers normally are incompatible with one another and a mere physical mixture of these polymers has very little strength and is not useful. To combine these advantageous properties in one product, it is necessary that the different polymeric segments be present as relatively large segments. The properties of polystyrene do not become apparent until the polymer consists essentially of at least about 20 recurring monomeric units. This same relationship applies to the polymeric segments present in the graft copolymers herein, i.e., if a graft copolymer comprising polystyrene segments is to be characterized by the advantageous properties of polystyrene, then those polystyrene segments must, individually, consist essentially of at least about 20 recurring monomeric units. This relationship between the physical properties of a polymeric segment in its minimum size is applicable to the polymeric segment of all graft copolymers herein. In general, the minimum size of a polymeric segment which is associated with the appearance of the physical properties of that polymer in the graft copolymers herein is that which consists of about 20 recurring monomeric units. Preferably, as noted earlier herein, the polymeric segments both of the copolymeric backbone and the sidechains, will consist essentially of more than about 30 recurring monomeric units. However, as it is well-known, the highly beneficial properties of polymers such as polystyrene are generally apparent when the polymer has a molecular weight of from about 5,000 to about 50,000, preferably from about 10,000 to about 35,000, more preferably 12,000 to about 25,000.

The polymeric segments of the graft copolymers of the invention may themselves be homopolymeric or they may be copolymeric. Thus, a graft copolymer of this invention may be prepared by the copolymerization of ethylene, propylene, and a terminated polystyrene containing a polymerizable alpha-olefin end group. The uninterrupted polymeric segments of the backbone of such a graft copolymer will be copolymeric segments of ethylene and propylene.

The graft copolymers comprising polymeric segments having fewer than about 20 recurring monomeric units are, nevertheless, useful for many applications, but the preferred graft copolymers are those in which the various polymeric segments have at least about 20 recurring monomeric units.

Although, as indicated, the graft copolymers herein are characterized by a wide variety of physical properties, depending on the particular monomers used in their preparation, and also on the molecular weights of the various polymer segments within a particular graft copolymer, all of these graft copolymers are useful, as tough, flexible, self-supporting films. These films may be used as food-wrapping material, painters' dropcloths, protective wrapping for merchandise displayed for sale, and the like.

Graft copolymers of the macromolecular monomer, polystyrene, with ethylene-propylene, isobutylene, or propylene oxide monomers have been found to be stable materials that behave like vulcanized rubbers, but are thermoplastic and reprocessable. Thus, an extremely tough, rubbery plastic is obtained without the inherent disadvantages of a vulcanized rubber. These copolymerized rubber-forming monomers with the macromolecular monomers of the present invention have the additional use as an alloying agent for dispersing additional rubber for impact plastics.

Just as metal properties are improved by alloying, so are polymer properties. By adding the appropriate amount of an incompatible material to a plastic in a microdispersed phase, over-all polymer properties are improved. A small amount of incompatible polybutadiene rubber correctly dispersed in polystyrene gives high impact polystyrene. The key to this microdispersion is a small amount of chemical graft copolymer that acts as a flux for incorporating the incompatible rubber.

In a similar manner, a copolymer of the macromolecular monomer of the present invention can be the flux for incorporating or dispersing incompatible polymers into new matrices making possible a whole new line of alloys, impact plastics, malleable plastics and, easy-to-process plastics.

The use of the graft copolymers as alloying agents is particularly exemplified in the case of polyethylene-polystyrene blends. As it is well-known, polyethylene and polystyrene are incompatible when blended together. However, when using the graft copolymers of the present invention as an alloying agent, the polyethylene and polystyrene phases can be conveniently joined.

For example, a blend prepared by mixing 90 to 51 parts by weight of commercial polyethylene (either low or high density), 10 to 49 parts by weight of commercial polystyrene and 5 to 30 parts by weight of a graft copolymer of the present invention comprising polystyrene sidechains and a polyethylene backbone are useful in making automobile parts, such as inner door panels, kick panels, and bucket seal backs, or appliance parts such as television components. Such blends are also useful as structural foams, sheets and films, containers and lids in packaging, beverage cases, pails, in the manufacture of toys, molded sheets in furniture, hot mold adhesives and computer and magnetic tapes.

The use of the graft copolymers of the present invention as an alloying agent offers a distinct advantage over the prior art blends, inasmuch as the plastic blend can be processed with minimized phase separation of the polystyrene and polyethylene polymers in the blend. The strength of the novel blends of the present invention is also improved over the blends of the prior art.

If polystyrene in the macromolecular monomer is replaced by a poly(alpha-methylstyrene) and is copolymerized with ethylene, a similar polyblend can be prepared as described above. However, these blends will have heat stability which will allow the resulting plastics to be useful in making hot water pipes, sheets in warm areas, and automobile parts, having oxidative stability over rubber-containing materials. These plastics also have utility in preparing reinforced fiberglass and fillers due to their good adhesion to fiberglass. Polyblends of poly(alpha-methylstyrene) graft copolymer with large amounts, i.e., 51-90 percent by weight of poly(alpha-methylstyrene) and 10–49percent polyethylene, exhibit a higher heat distortion, together with high impact strength and high modulus. These plastics are useful in various engineering applications and in the manufacture of parts for aircraft, auto bodies, recreational vehicles, appliances, gears, bearings, etc.

Another useful blend utilizing the graft copolymers of the present invention comprises mixing 10 to 49 parts of low density polyethylene, 51 to 91 parts by weight of poly(alpha-methylstyrene) and zero to 30 parts by weight of polystyrene and 5 to 30 parts by weight of the graft copolymer of the present invention comprising polyethylene backbone with poly(alpha-methylstyrene) or polystyrene sidechains. The blend is extruded in a mill and the resultant plastic is found useful in making appliances such as coffee makers, humidifiers, high intensity lamps, color television sets, kitchen-range hardware, blenders, mixers, and electric toothbrushes. These plastics are also useful in preparing recreational vehicles such as snowmobile parts and helmets; machine parts such as gears, bearings; plumbing parts such as shower heads, valves, fittings and ballcocks; and motor housing, stamping, lawn sprinklers, stereo tape or cartridges, etc.

The reinforcement of plastics by adding glass fibers or other materials is difficult to achieve because of poor wetting character of many basic polymers. The macromolecular monomers of the present invention, particularly those containing reactive polystyrene, have a tendency to wet and bond to glass with facility. By proper dispersion of glass in a macromolecular copolymer, it is possible to upgrade the bond between the dispersed phase and glass. Thus, the macromolecular graft copolymers of the present invention can also be used as reinforcing adhesion aids to glass fibers.

The invention is illustrated further by the following examples which, however, are not to be taken as limiting in any respect. In each case, all materials should be pure and care should be taken to keep the reacted mixtures dry and free of contaminants. All parts and percentages, unless expressly stated to be otherwise, are by weight.

Preparation Of Macromolecular Monomer Sidechains Having Uniform Molecular Weight

EXAMPLE 1 a. Preparation Of Polystyrene Terminated With Allyl Chloride:

A stainless steel reactor is charged with 76.56 parts of A.C.S. grade benzene (thiophene-free), which had been pre-dried by Linde molecular sieves and calcium hydride. The reactor is heated to 40°C and 0.015 parts of diphenylethylene is added to the reactor by means of a hypodermic syringe. A 12.1 percent solution of sec-butyl lithium in hexane is added to the reactor portionwise until the retention of a permanent orange-yellow color, at which point an additional 0.885 parts (1.67 moles) of sec-butyl lithium solution is added, followed by the addition of 22.7 parts (218 moles) of styrene over a period of 44 minutes. The reactor temperature is maintained at 36°–42°C. The living polystyrene is terminated by the addition of 0.127 parts of allyl chloride to the reaction mixture. The resulting polymer is precipitated by the addition of the alpha-olefin terminated polystyrenebenzene solution into methanol, whereupon the polymer precipitates out of solution. The alpha-olefin terminated polystyrene is dried in an air circulating atmosphere drier at 40°–45°C and then in a fluidized bed to remove the trace amounts of methanol. The methanol content after purification is 10 parts per million. The molecular weight of the polymer, as determined by membrane phase osmometry, is 15,400 (theory: 13,400) and the molecular weight distribution is very narrow, i.e., the $\overline{M}w/\overline{M}n$ is less than 1.05. The macromolecular monomer has the following structural formula:

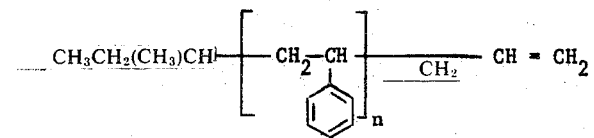

wherein n has a value such that the molecular weight of the polymer is 15,400.

b. The procedure of Example 1(a) is repeated using, in place of allyl chloride, an equivalent amount of methallyl chloride to produce a methallyl terminated polystyrene.

c. The procedure of paragraph (a) is repeated using, in place of styrene, an equivalent amount of ethylene oxide to produce a crystalline polyoxyethylene living polymer. The living polymer is terminated by the addition of a molar equivalent amount of vinylbenzyl chloride to produce a polymer having the following structural formula:

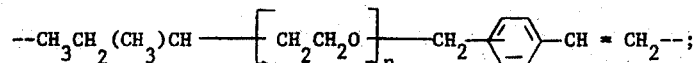

EXAMPLE 2 a. Preparation Of Poly(alpha-methylstyrene) Terminated With Allyl Chloride:

A solution of 472 grams (4.0 moles) of alpha-methylstyrene in 2500 ml. of tetrahydrofuran is treated dropwise with a 12 percent solution of n-butyl lithium in hexane until the persistence of a light red color. An additional 30 ml. (0.0383 mole) of this n-butyl lithium solution is added, resulting in the development of a bright red color. The temperature of the mixture is then lowered to −80°C, and after 30 minutes at this temperature, 4.5 grams (0.06 mole) of allyl chloride is added. The red color disappears almost immediately, indicating termination of the living polymer. The resulting colorless solution is poured into methanol to precipitate the alpha-olefin terminated poly(alpha-methylstyrene) which is shown by vapor phase osmometry to have a number average molecular weight of 11,000 (theory: 12,300) and the molecular weight distribution is very narrow, i.e., the $\overline{M}w/\overline{M}n$ is less than 1.05. The macromolecular monomer produced has the following structural formula:

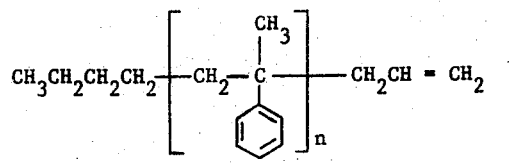

wherein n has a value such that the molecular weight of the polymer is 11,000.

The procedure of paragraph (a) is repeated using, in place of n-butyl lithium, a solution of an equivalent amount of potassium t-butyl alkoxylate and in place of alpha-methylstyrene, an equivalent amount respectively of:

b. 4-vinyl pyridine, terminating with a molar equivalent of allyl chloride to produce a polymer having the following structural formula:

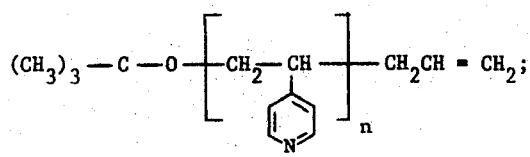

c. methacrylonitrile, terminating with a molar equivalent of vinylbenzyl chloride to produce a polymer having the following structural formula:

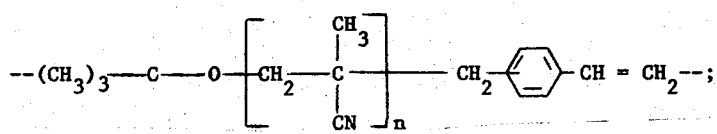

d. methyl methacrylate, terminating with vinylbenzyl chloride to produce a polymer having the following structural formula:

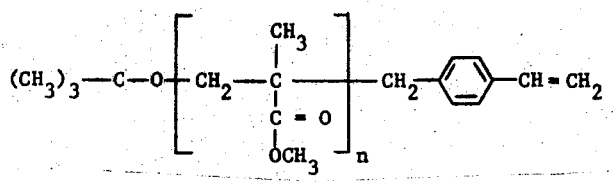

e. N,N-dimethylacrylamide, terminating with p-vinylbenzyl chloride to produce a polymer having the following structural formula:

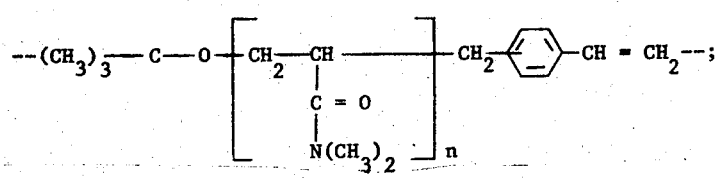

EXAMPLE 3

Preparation Of Polystyrene Terminated With Vinyl Chloroacetate

A solution of one drop of diphenyl ethylene in 2500 ml. of cyclohexane at 40°C is treated portionwise with a 12% solution of sec-butyl lithium in cyclohexane until the persistence of a light red color, at which point an additional 18 ml. (0.024 mole) of the sec-butyl lithium is added, followed by 312 grams (3.0 moles) of styrene. The temperature of the polymerization mixture is maintained at 40°C for 30 minutes, whereupon the living polystyrene is capped by treatment with 8 ml. (0.040 mole) of diphenyl ethylene, then terminated by treatment with 6 ml. (0.05 mole) of vinyl chloroacetate. The resulting polymer is precipitated by addition of the cyclohexane solution to methanol and the polymer is separated by filtration. Its number average molecular weight, as determined by vapor phase osmometry, is 12,000 (theory: 13,265), and the molecular weight distribution is very narrow, i.e., the $\overline{Mw}/\overline{Mn}$ is less than 1.06. The macromolecular monomer produced has the following structural formula:

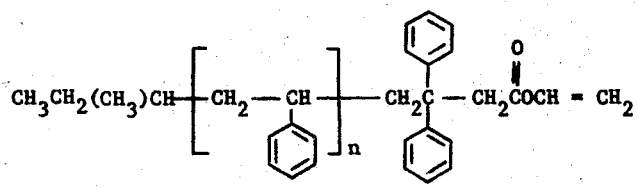

wherein $n$ has a value such that the molecular weight of the polymer is 12,000.

EXAMPLE 4

Preparation Of Poly(alpha-methylstyrene) Terminated With Vinyl Chloroacetate

A solution of 357 grams (3.0 moles) of alpha-methylstyrene in 2500 ml. of tetrahydrofuran is treated dropwise with a 12 percent solution of t-butyl lithium in pentane until the persistence of a light red color. Thereupon, an additional 15.0 ml. (0.03 mole) of the t-butyl solution is added, resulting in the development of a bright red color. The temperature of the mixture is then lowered to −80°C, and after 30 minutes at that temperature, 5.6 ml. of diphenyl ethylene is added. The resulting mixture is poured into 5.0 ml. (0.04 mole) of vinyl chloroacetate and the thus-terminated poly(alpha-methylstyrene) is precipitated with methanol and separated by filtration. Its number average molecular weight, as determined by vapor phase osmometry, is 14,280 (theory: 12,065) and the molecular weight distribution is very narrow. The macromolecular monomer produced has the following structural formula:

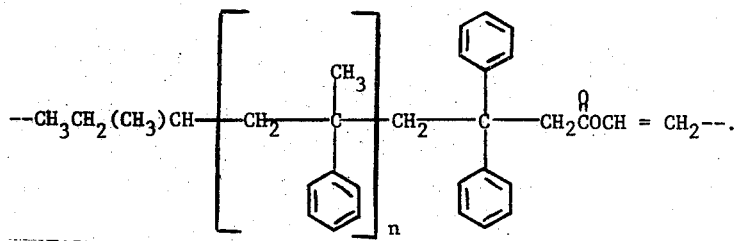

wherein $n$ has a value such that the molecular weight of the polymer is 14,280.

EXAMPLE 5

Preparation of Polystyrene Terminated With Vinyl-2-Chloroethyl Ether

A solution of one drop of diphenyl ethylene at 40°C is treated portionwise with a 12 percent solution of t-butyl lithium in pentane until the persistence of a light red color, at which point an additional 30 ml. (0.04 mole) of the t-butyl lithium solution is added, followed by 312 grams (3.0 moles) of styrene. The temperature of the polymerization mixture is maintained at 40°C for 30 minutes, whereupon the living polystyrene is terminated by treatment with 8 ml. (0.08 mole) of vinyl-2-chloroethyl ether. The resulting polymer is precipitated by addition of the benzene solution to methanol and the polymer is separated by filtration. Its number average molecular weight, as determined by vapor phase osmometry, is 7,200 (theory: 7,870) and the molecular weight distribution is very narrow, i.e., the $\overline{M}w/\overline{M}n$ is less than 1.06.

The macromolecular monomer produced has the following structural formula:

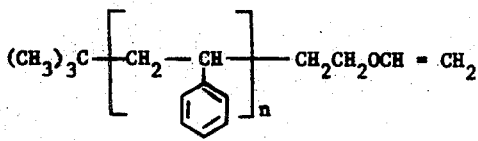

wherein n has a value such that the molecular weight of the polymer is 7,200.

EXAMPLE 6

Preparation Of Polystyrene Terminated With Epichlorohydrin

A benzene solution of living polystyrene is prepared in Example 5 and terminated by treatment with 10 grams (0.10 mole) of epichlorohydrin. The resulting terminated polystyrene is precipitated with methanol and separated by filtration. Its molecular weight, as shown by vapor phase osmometry, is 8,660 (theory: 7,757) and its number average molecular weight distribution is very narrow. The macromolecular monomer produced has the following structural formula:

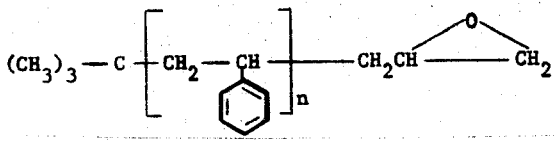

wherein n has a value such that the molecular weight of the polymer is 8,660.

EXAMPLE 7 a. Preparation Of Polystyrene Terminated With Methacrylyl Chloride

To a solution of 0.2 ml. of diphenyl ethylene in 2500 ml. of benzene there is added dropwise a 12 percent solution of n-butyl lithium in hexane until the persistence of a light reddish-brown color. An additional 24 ml. (0.031 mole) of this n-butyl lithium solution is added, and then, 416 grams (4.0 moles) of styrene, resulting in the development of an orange color. A temperature of 40°C is maintained throughout by external cooling and by controlling the rate at which the styrene is added. This temperature is maintained for an additional 30 minutes after all of the styrene has been added, and then is lowered to 20°C, whereupon 4.4 grams (0.1 mole) of ethylene oxide is added, causing the solution to become colorless. The living polymer is terminated by reaction with 10 ml. (0.1 mole) of methacrylyl chloride. The resulting polymer has a number average molecular weight as shown by vapor phase osmometry of 10,000. The macromolecular monomer has the following structural formula:

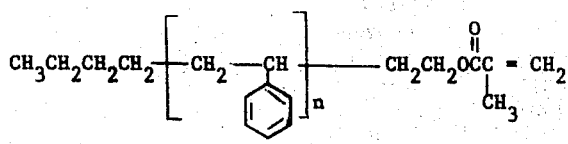

wherein n has a value such that the molecular weight of the polymer is 10,000.

b. Acrylyl chloride is substituted for methacrylyl chloride in the above procedure to give an acrylic acid ester end group on the polystyrene chain.

c. Allyl chloride is substituted for methacrylyl chloride in procedure (a) to produce an allyl ether terminated polystyrene.

d. Methallyl chloride is substituted for methacrylyl chloride in procedure (a) to produce methallyl ether terminated polystyrene.

e. Maleic anhydride is substituted for methacrylyl chloride in procedure (a), followed by protonation with water to produce polystyrene terminated with the half ester of maleic acid.

f. Epichlorohydrin is substituted for methacrylyl chloride to produce an epoxy ether terminated polystyrene.

g. The procedure of (a) is repeated using in place of styrene, an equivalent amount of isoprene and in place of n-butyl lithium an equivalent amount of sec-butyl lithium to produce primarily a rubbery cis-1,4-polyisoprene. The low Tg living polymer is terminated by the addition of a molar equivalent, based on sec-butyl lithium, ethylene oxide as a capping agent, followed by a molar equivalent amount of allyl chloride to produce a polymer predominantly having the following structural formula:

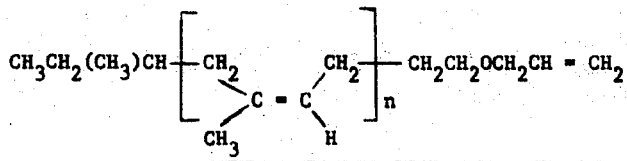

EXAMPLE 8

Preparation Of Polystyrene Terminated With Methacrylyl Chloride

A stainless steel reactor is charged with 32 gallons of A.C.S. grade benzene (thiophene-free), which had been predried by Linde molecular sieves and calcium hydride. The reactor is heated to a temperature of between 38°–40°C and 10 ml. of diphenyl ethylene is added to the reactor by means of a hypodermic syringe. An 11.4% solution of secondary butyl lithium in hexane is added to the reactor portionwise until the retention of a permanent orange-yellow color is obtained (60 ml.), at which point an additional 3.44 pounds of the secondary butyl lithium in hexane is added to the reactor, followed by the addition of 82.5 pounds of purified styrene over a period of 1 hour and 40 minutes. The reactor temperature is maintained at 38°–40°C. The living polystyrene is capped by the addition of 0.28 pounds of ethylene oxide and the reaction solution changes from a red-orange color to yellow. The resulting capped living polystyrene is thereafter reacted with 260 ml. of methacrylyl chloride and the solution changes to a very pale yellow color. The methacrylate terminated polystyrene is precipitated by the addition of the polymer benzene solution into methanol, whereupon the polymer precipitates out of solution. The polymer is dried in an air circulating atmosphere drier at 40°–45°C and then in a fluidized bed to remove the trace amounts of methanol. The molecular weight of the polymer as determined by membrane phase osmometry, is 13,400 and the molecular weight distribution is very narrow, i.e., the $\overline{Mw}/\overline{Mn}$ is less than 1.05

EXAMPLE 9

Preparation Of Polystyrene Terminated With Maleic Anhydride

A stainless steel reactor is charged with 2.5 liters of A.C.S. grade benzene (thiophene-free), which had been predried by Linde molecular sieves and calcium hydride. The reactor is heated to 40°C and 0.2 ml. of diphenyl ethylene is added to the reactor by means of a hypodermic syringe. A 12.1 percent solution of sec-butyl lithium in hexane is added to the reactor portionwise until the retention of a permanent orange-yellow color is obtained (0.7 ml.), at which point an additional 22.3 ml. of sec-butyl lithium solution is added, followed by the addition of 421.7 grams of styrene over a period of 16 minutes. The reactor temperature is maintained at 40°–45°C. Five minutes after styrene addition is completed, ethylene oxide is added from a lecture bottle subsurface intermittently until the solution is water white. One hour after ethylene oxide addition is complete, 20.55 ml. of maleic anhydridebenzene solution (the maleic anhydride solution was prepared by dissolving 84 grams of maleic anhydride in 550 grams of purified benzene) is added to the capped living polymer. One hour after the addition of the maleic anhydride solution, the contents of the reactor are discharged and precipitated in methanol. The maleic half ester terminated polystyrene had a molecular weight of about 14,000, as determined by Gel Permeation Chromatography. The polymerizable macromolecular monomer has a structural formula represented as follows:

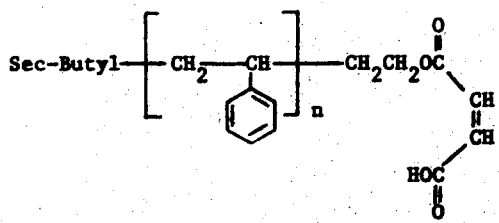

EXAMPLE 10

Preparation Of Polybutadiene Terminated With Allyl Chloride

C.P. grade 1,3-butadiene (99.0 percent purity) is condensed and collected in 1-pint soda bottles. These bottles had been oven baked for 4 hours at 150°C, nitrogen purged during cooling, and capped with a perforated metal crown cap using butyl rubber and polyethylene film liners. These bottles containing the butadiene are stored at −10°C with a nitrogen pressure head (10 psi) in a laboratory freezer before use. Hexane solvent is charged to the reactors and heated to 50°C, followed by the addition of 0.2 ml. of diphenyl ethylene by way of a syringe. Secondary butyl lithium is added dropwise via syringe to the reactor until the red diphenyl ethylene anion color persists for at least about 10–15 minutes. The reactor temperature is lowered to 0°C, and 328.0 grams of butadiene is charged into the polymerization reactor, followed by the addition of 17.4 ml. (0.02187 mole) of a 12 percent secondary butyl lithium solution in hexane, when half of the butadiene charge has been added to the reactor. The butadiene is polymerized for 18 hours in hexane at 50°C. Following the polymerization, 400 ml. portions of the anionic polybutadiene solution in the reactor is transferred under nitrogen pressure into capped bottles. Allyl chloride (0.48 ml., 0.00588 mole) is injected into each of the bottles. The bottles are clamped in water baths at temperatures of 50°C and 70°C for periods of time ranging up to 24 hours. The samples in each of the bottles are short stopped with methanol and Ionol solution and analyzed by Gel Permeation Chromatography. Each of the samples is water white and the analysis of the Gel Permeation Chromatography scans reveals that each of the samples had a narrow molecular weight distribution.

Several comparison samples were conducted in bottles coming from the same lot of living polybutadiene, which were capped with 2-chlorobutane (0.4 ml., 0.00376 mole) as the terminating agent. The resulting polymers terminated with 2-chlorobutane were yellow in color and after standing for a period of 24 hours at 70°C, appeared to have a broad molecular weight distribution as revealed by the Gel Permeation Chromatography scan. It is clear that the reaction and reaction product of 2-chlorobutane with anionic polybutadiene are different than the reaction and reaction product of allyl chloride and anionic polybutadiene.

EXAMPLE 11

Preparation Of Methacrylate Terminated Polyisoprene

A one-gallon Chemco glass-bowl reactor is charged with 2.5 liters of purified heptane which had been predried by a Linde molecular sieve and calcium hydride, followed by the addition of 0.2 ml. of diphenyl ethylene as an indicator and the reactor is sterilized with the dropwise addition of tertiary butyl lithium solution (12 percent in hexane) until the retention of the characteristic light yellow color is obtained. The reactor is heated to 40°C and 19.9 ml. (0.025 mole) of a 12 percent solution of tertiary butyl lithium in hexane is injected into the reactor via hypodermic syringe, followed by the addition of 331.4 grams (4.86 moles) of isoprene. The mixture is allowed to stand for one hour at 40°C and 0.13 mole of ethylene oxide is charged into the reactor to cap the living polyisoprene. The capped living polyisoprene is held at 40°C for 40 minutes, whereupon 0.041 mole of methacrylyl chloride is charged into the reactor to terminate the capped living polymer. The mixture is held for 13 minutes at 40°C, followed by removal of the heptane solvent by vacuum stripping. Based upon the Gel Permeation Chromatography scans for polystyrene, the molecular weight of the methacrylate terminated polyisoprene by Gel Permeation Chromatography was about 10,000 (theory:

13,000). The methacrylate terminated polyisoprene macromolecular monomer had a structural formula represented as follows:

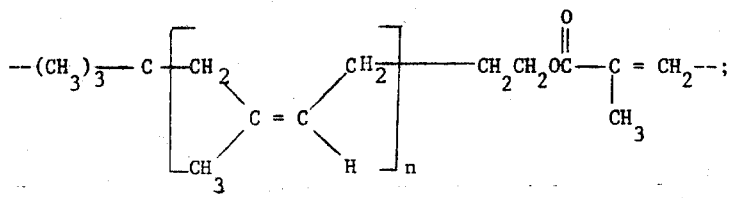

EXAMPLE 12

Preparation Of Alpha-Olefin Terminated Polyisoprene

A one-gallon Chemco glass-bowl reactor is charged with 2.5 liters of purified heptane which had been pre-dried by a Linde molecular sieve and calcium hydride, followed by the addition of 0.2 ml. of diphenyl ethylene as an indicator. The reactor and solvent are sterilized by the dropwise addition of tertiary butyl lithium solution (12 percent in hexane) until the retention of the characteristic light yellow color is obtained. The reactor is heated to 40°C and 19.03 ml. (0.02426 mole) of tertiary butyl lithium solution is injected into the reactor via hypodermic syringe, followed by the addition of 315.5 grams (4.63 moles) of isoprene. The polymerization is permitted to proceed at 50°C for 66 minutes and at this time 2.0 ml. (0.02451 mole) of allyl chloride is added to the living polyisoprene. The terminated polyisoprene is held at 50°C for 38 minutes, whereupon the polymer is removed from the reactor to be used in copolymerization reactions. The polymer was analyzed by Gel Permeation Chromatography and had a very narrow molecular weight distribution, i.e., an $\overline{Mw}/\overline{Mn}$ of less than about 1.06. The theoretical molecular weight of the polymer is 13,000. The polymerizable macromolecular monomer had a structural formula represented as follows:

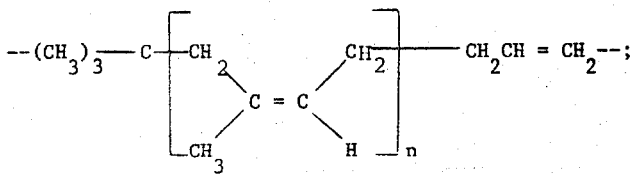

EXAMPLE 13

Polymerization Of Styrene With Vinyl Lithium

To a one gallon Chemco reactor, there is added 2500 ml. of tetrahydrofuran and cooled to 15°C., at which time 6.5 ml. of a 11.2 percent solution of vinyl lithium in tetrahydrofuran (0.2 mole lithium) is added to the reactor, imparting a light tan color to the solution. The vinyl lithium was purchased from Alpha Inorganics Ventron of Beverly, Massachusetts, as a two molar solution in tetrahydrofuran. Analysis of the solution by several methods showed that the solution contained 11.2 percent active lithium. After the vinyl lithium solution is added, a 0.25 mole styrene charge is added to the reactor via syringe with the observation of a small exotherm of about 1°C (the reactor temperature is controlled by liquid nitrogen cooling coils inside the reactor at a temperature of 15°C). Ten minutes after the styrene is added, 3.6 ml. of water is added to the reactor, resulting in an almost immediate change in color from deep orange-brown to water white and a considerable gas evolution is observed (the internal pressure in the reactor increased from 8 psig to 12 psig). A sample is taken from the head space (about 2.5 liters in volume) and from the liquid phase at the same time (the two samples are analyzed and identified as containing large amounts of ethylene). The styrene polymer is withdrawn from the reactor and analyzed. The GPC molecular weight of the polystyrene is 108,000, as measured against the Pressure Chemical Company sample 2(b) standard certified as $\overline{Mw}/\overline{Mn} = 1.06$, $\overline{Mw} = 20,800 \pm 800$ and $\overline{Mn} = 20,200 \pm 600$. Measured against the same standard, the weight average molecular weight of the polymer is 99,000 and the number average molecular weight is 66,000. The polydispersity of the polymer is 1.49. Based upon the limiting polydispersity of about 1.33 for living polymers, as indicated in Henderson et al., Macromolecular Reviews, Vol. 3, Interscience Publishers, page 347 (1968), several side reactions obviously occur when using vinyl lithium as a polymerization initiator. In addition, the broad molecular weight distribution and the inability to control the molecular weight of the polymer is indicative that the initiation rate of vinyl lithium is extremely slow. Accordingly, the vinyl lithium initiated polystyrene is not suitable in the preparation of the graft copolymers of the present invention in preparing chemically joined, phase separated graft copolymers, which have sidechains of controlled and uniform molecular weights.

Attempted copolymerization of the vinyl lithium initiated polystyrene with methyl methacrylate and acrylonitrile under free-radical conditions only results in a mixture of polystyrene and the respective poly(methyl methacrylate) or polyacrylonitrile. Also, attempted copolymerization of the alpha-olefin terminated polystyrene of Example 1(a) with methyl methacrylate and acrylonitrile under free-radical conditions only resulted in a mixture of homopolymers as determined by IR analysis of the benzene and cyclohexane extracts. This result is expected due to the inability of alpha-olefins to polymerize under free-radical conditions.

Preparation Of Graft Copolymers Having Macromolecular Monomers Integrally Polymerized Into The Backbone

EXAMPLE 14

Preparation Of Graft Copolymer From Poly(alpha-methylstyrene) Macromolecular Monomer Terminated With Allyl Chloride And Ethylene A solution of 20 grams of poly(alpha-methylstyrene) macromolecular monomer terminated with allyl chloride and having an average molecular weight of 10,000 prepared as in Example 2(a) in 100 ml. of cyclohexane is prepared and treated with 5.5 ml. of 0.645 M (9.1 percent solution) diethyl aluminum chloride in hexane and 2 ml. of vanadium oxytrichloride, then pressured with ethylene to 30 psig. This system is agitated gently for about 1 hour at 30°C, whereupon a polymeric material precipitates from the solution. It is recovered by filtration and pressed into a thin transparent film which is tough and flexible.

EXAMPLE 15 a. Preparation Of Graft Copolymer Having A Polyethylene Backbone And Polystyrene Sidechains:

One gram of the alpha-olefin terminated polystyrene of uniform molecular weight prepared in Example 1(a) is dissolved in 1500 ml. of cyclohexane and charged into a 2-liter "Chemco" reactor. The reactor is purged with prepurified nitrogen for 30 minutes, and 22 ml. of 25 percent ethylaluminum sesquichloride solution (in heptane) is added. The reaction is pressured to 40 psi with 20 grams of ethylene into the solution. Thereafter, 0.1 ml. of vanadium oxytrichloride is added and the ethylene pressure drops from 40 psi to 1 psi in about 1 minute. The reaction is terminated in 3 minutes by the addition of isopropanol. The polymer is recovered by filtration and slurried with cyclohexane and then with isopropanol. The yield is 18.0 grams of a fluffy, white copolymer having a macromolecular monomer sidechain content of 5.8 percent, as determined by I.R. Extraction and analysis of the extracts indicate all of the macromolecular monomer and 17.0 grams of the ethylene copolymerized.

b. The procedure in Example 15 (a) is repeated, except that 2.0 grams of the macromolecular monomer is used instead of 1.0 gram. The yield of the copolymer is 20.5 grams and the macromolecular monomer sidechain content, as determined by I.R., is 10 percent.

EXAMPLE 16 a. Preparation of Graft Copolymer Having A Polyethylene Backbone And Polystyrene Sidechains:

A 2-liter "Chemco" reactor is charged with 1500 ml. of purified cyclohexane. 20 grams of alpha-olefin terminated polystyrene prepared in Example 1(a) is added and dissolved in the purified cyclohexane. The reactor is thereafter purged with prepurified nitrogen for one hour with concurrent slow agitation. Ethylene is added to the reactor at the rate of 5 liters per minute to a pressure of 5 psi. The contents of the reactor is heated and controlled at 25°C, and high speed stirring is started; ethylaluminum sesquichloride (22.8 ml., 25 percent in heptane) catalyst is injected into the reactor by a hypodermic syringe, followed by the addition of 0.1 ml. of vanadium oxytrichloride. Polymerization begins immediately and the ethylene pressure in the reactor drops to nearly zero in about a minute. At this point, the ethylene rate is reduced to 0.5 liter per minute, and cooling is used to maintain a temperature of 25°C. At the end of one hour, a total of 43 grams of ethylene has been charged into the reactor, and the reactor is full of a fluffy polymer slurry. The reaction is stopped by the addition of 50 ml. of isopropanol to inactivate the catalyst.

The polymer is recovered by filtration, slurried and boiled in 1.5 liters of benzene for one hour, then refiltered to remove all the unreacted alpha-olefin terminated polystyrene from the copolymer. The polymer is then slurried in 1.5 liters of isopropanol and 0.03 gram of Irganox 1010 anit-oxidant is added and then filtered and dried in a vacuum oven at 50°C. The yield is 49 grams of a fluffy, white copolymer having an alpha-olefin terminated polystyrene content of 16 percent, as determined by I.R. of a pressed film.

b. Preparation Of Graft Copolymer Having A Polyethylene Backbone And Poly(alpha-methylstyrene) Sidechains:

The macromolecular monomer used to produce the sidechains is first prepared by repeating the procedure described in Example 2(a), except that in place of the n-butyl lithium, 14 ml. (0.0178 mole) of sec-butyl lithium (12 percent solution in heptane) is used as the initiator. The number average molecular weight, as determined by gel permeation chromatography, is 26,000 (theory: 26,500) and the molecular weight distribution is very narrow, i.e., the $\overline{Mw}/\overline{Mn}$ is less than 1.05.

Four liters of cyclohexane (Phillips polymerization grade) and 200 grams of the alpha-olefin terminated poly(alpha-methylstyrene) macromolecular monomer produced as described above are charged into a "Chemco" reactor. The mixture is heated to 70°C with concurrent stirring to dissolve the macromolecular monomer. The reactor is purged with high purity nitrogen for one hour with stirring. Ethylene gas is introduced into the reactor to a pressure of 5 psi, followed by 228 ml. of ethylaluminum sesquichloride (25 percent in heptane) and 1.0 ml. vanadium oxytrichloride. Agitation is increased and polymerization begins immediately, as noted by the pressure in the reactor dropping to nearly zero. The ethylene flow rate is adjusted to 5 litres per minute, and the internal temperature is controlled at 70°C. At the end of one hour, the reaction is terminated by the addition of 500 ml. of isopropanol to inactivate the catalyst.

The polymer is isolated by centrifugation, slurried with benzene for 1 hour, and recentrifuged. The copolymer is then slurried in 5 liters of methanol and 0.3 gram of Irganox 1010 for one hour, centrifuged and dried in an oven at 50°C. The yield is 260 grams having an alpha-olefin terminated poly(alpha-methylstyrene) content of 22 percent, as determined by I.R. analysis of a pressed film.

EXAMPLE 17

Preparation Of Graft Copolymer Having An Ethylene-Propylene Copolymeric Backbone And Polystyrene Sidechains A 2-liter "Chemco" reator is charged with 1½ liters of dry benzene and 50 grams of poly(alpha-methylstyrene) terminated with allyl chloride (as prepared in Example 2). The macromolecular monomer is dissolved by stirring and thereafter purged with nitrogen. The reactor is then charged with ethylene and propylene gases at the rate of 200 ml./minute and 800 ml./minute, respectively, to build-up 10 psi pressure in the reactor. While maintaining a reaction temperature of 25°–35°C, 2 ml. of vanadium oxytrichloride and 4 ml. of ethylaluminum sesquichloride solution (25 percent in heptane) are added to the reaction mixture by means of syringe to initiate polymerization. As the polymerization is started, additional macromolecular monomer (335 ml. of 10% macromolecular solution) is added in solution form, i.e., 70 grams of the macromolecular monomer is dissolved in 630 ml. of dry benzene, and pumped in by Micro-Bellow-pump. During the reaction, the flow rate of the gases are checked constantly to insure that the ethylene and propylene feed rate are at the same initial level. Additional catalyst, $Et_3Al_2Cl_3$ (27 ml. in 25% heptane) and $VOCl_3$ (1.8 ml.) is added by syringe during the reaction, as the rate of polymerization slowed down, which is observed by a build-up of the internal pressure in the reactor. After one hour, the polymerization is terminated by the addition of 20 ml. of isopropyl alcohol. The product is precipitated in methanol and 51 grams of a white, rubbery polymer is obtained.

EXAMPLE 18

Preparation Of Graft Copolymer Having Ethylene-Propylene Copolymeric Backbone And Polystyrene Sidechains A 1-gallon "Chemco" reactor is charged with 3 liters of dried cyclohexane and 10 grams of polystyrene terminated with allyl chloride (as prepared in Example 1). The solution is purged with nitrogen for 30 minutes. 20 ml. of tri-n-hexylaluminum (25 percent) solution is added, followed by the addition of 139.5 grams of propylene to obtain a pressure of 26 psi and 20.4 grams of ethylene to obtain a pressure of 48 psi. Finally, there is added 0.2 ml. of vanadium oxytrichloride and a drop in pressure is observed. The polymerization is terminated after 10 minutes by the addition of 10 ml. of isopropanol.

The terpolymer solution is added slowly, with stirring, to a 4-liter beaker containing methanol to coagulate the polymer. The polymer which separated is air dried overnight. To remove the trace of catalyst residue, the gray colored polymer is dissolved in 500 ml. of cyclohexane and placed in a 2-liter resin flask, together with 1 liter of distilled water containing 0.1 gram of NaOH, and refluxed at 80°C for 2 hours. The contents are transferred into a 2-liter separatory funnel, and the bottom water layer is drained. The upper cyclohexane layer is added to methanol slowly, with stirring, to coagulate the polymer. The recovered polymer is dried in a vacuum oven. The unreacted macromolecular monomer is removed from the dried polymer by first dissolving in cyclohexane and adding dropwise to methyl ethyl ketone, with stirring. The terpolymer which is insoluble in methyl ethyl ketone is filtered and dried in a vacuum oven, and a yield of 52 grams is obtained. The terpolymer has improved tensile strength compared to ethylene-propylene copolymers prepared in the same manner without the macromolecular monomer.

EXAMPLE 19

Preparation Of Graft Copolymer Having Polyisoprene Backbone And Polystyrene Sidechains 500 ml. of dried cyclohexane is charged into a reactor, followed by the addition of 100 ml. (68 grams) of freshly distilled isoprene (Phillips polymerization grade), together with 17 grams of polystyrene terminated with allyl chloride (as prepared in Example 1). The reactor is sealed, followed by the addition of 2.5 ml. of tri-nhexylaluminum solution (25 percent in heptane) and 0.16 ml. of titanium tetrachloride with hypodermic syringes. The reactor is agitated at 55°C for 16 hours, whereupon the contents of the reactor are slowly poured, with stirring, into a 4-liter beaker containing 2 liters of a 1 percent solution of Ionol antioxidant in isopropanol. A tough, rubbery, copolymer is obtained.

EXAMPLE 20

Preparation Of Graft Copolymer Having a Polystyrene Backbone And Polyoxyethylene Sidechains Equal parts of the polyoxyethylene terminated with vinylbenzyl chloride prepared in Example 1(c) and styrene monomer are placed in a reactor containing 1,000 ml. of benzene. The reactor is heated to 60°C and one part by weight of azobisisobutyronitrile free-radical polymerization catalyst is added. The polymerization is complete in three hours, obtaining a graft copolymer having hydrophilic-hydrophobic properties. The graft copolymer also reduces hydrostatic charges and is an alloying agent for polystyrene and polyoxyethylene.

EXAMPLE 21

Preparation Of Graft Copolymer Having A Polypropylene Backbone And Cis-1,4-Polyisoprene Sidechains A 1-gallon "Chemco" reactor is charged with 3 liters of heptane and 10 grams of allyl ether terminated cis-1,4-polyisoprene (as prepared in Example 7(g)). The macromolecular monomer is dissolved by stirring and thereafter the solution is purged with nitrogen for 30 minutes. 10 ml. of diethylaluminum chloride (25 percent solution in heptane) is added, followed by the addition of 0.3 gram of $TiCl_3$. 139.5 grams of propylene is added to obtain a pressure of 26 psi. The reactor is heated to 60°C, and polymerization is terminated after 18 hours, whereupon the contents of the reactor are slowly poured, with stirring, into a 4-liter beaker containing 2 liters of 1 percent solution of Ionol antioxidant in isopropanol. The graft copolymer has higher impact properties than polypropylene homopolymer.

EXAMPLE 22

Preparation of Graft Copolymer Having Polyisobutylene Backbone and Polystyrene Sidechains To a solution of 20 grams of polystyrene macromer terminated with epichlorohydrin and having an average molecular weight of 10,000 in 1,000 ml. of toluene at −70°C, there is added 80 grams of isobutylene. 45 ml. of boron trichloride ethyl ether complex is added slowly, the temperature being maintained at −70°C throughout. Polymerization occurs as the catalyst is added and is complete almost immediately after all of the catalyst has been added. The resulting graft copolymer is obtained by evaporating away the toluene and washing the residual solid with methanol.

EXAMPLE 23

Preparation of Graft Copolymer Having Polyisobutylene Backbone and Polystyrene Sidechains To 1,000 ml. of methyl chloride at −70°C there is added 10 grams of polystyrene macromer terminated with epichlorohydrin, having an average molecular weight of 10,000. To this resulting solution maintained at −70°C, there is added concurrently and dropwise, a solution of 2 grams of aluminum chloride in 400 ml. of methyl chloride and 90 grams of isobutylene. The time required for these additions is one hour and at the end of this time polymerization is substantially complete. The resulting insoluble graft copolymer is isolated by evaporation of the methylene chloride. Similar results are obtainable by employing either a methallyl or methacrylyl end group on the polystyrene such as the product prepared in Examples 1(b), 7(a) and 7(d).

EXAMPLE 24 a. Preparation of Polystyrene Macromolecular Monomer, Capped With Butadiene and Terminated With Allyl Chloride:

2.5 liters of benzene (thiophene-free) are charged into the reactor and heated to 40°C. 0.2 ml. of diphenyl ethylene is added as an indicator and the reactor is sterilized with dropwise addition of a 12 percent solution of sec-butyl lithium until the persistence of an orangered color. At this point, an additional 18 ml. (0.024 mole) of sec-butyl lithium solution (12% in hexane) is added, followed by 416 grams (4.0 moles) of styrene. The temperature of the polymerization mixture is maintained at 40°C for 5 minutes. Then the living polystyrene is capped with butadiene by bubbling butadiene gas into the reactor until the color of the solution changes from dark red to orange. The living polymer is terminated by treatment with 4.1 ml. (0.05 mole) of allyl chloride. The macromolecular monomer thus prepared is precipitated with methanol and separated by filtration. Its number average molecular weight estimated from gel permeation chromotography is 25,000 (theory: 18,000) and molecular weight distribution is very narrow. The macromolecular monomer produced has the following structural formula:

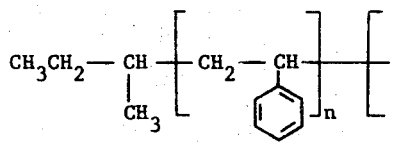 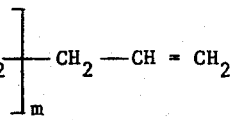

where $m$ equals 1 or 2.

b. Preparation of Graft Copolymer Having A Polyethylene Backbone And Polystyrene Sidechains:

2 grams of butadiene capped, alpha-olefin terminated polystyrene macromolecular monomer as prepared in Example 24(a) above, is dissolved in 1500 ml. of cyclohexane and charged into a 2-liter "Chemco" reactor. The reactor is purged with prepurified nitrogen for 30 minutes, and 22 ml. of 25 percent ethylaluminum sesquichloride solution (in heptane) is added. The reactor is pressurized with 21 grams of ethylene to 40 psi. Thereafter, 0.1 ml. of vanadium oxytrichloride is added and ethylene pressure is dropped from 40 psi to 1 psi in about 1 minute. The reactor is terminated in 3 minutes by the addition of isopropanol. The polymer is recovered by filtration.

It is known that the physical properties of linear high density polyethylene are dependent on its extent of crystallinity, molecular weight and molecular weight distribution. It is a balance of these characteristics that generally governs the end use properties of fabricated items. The graft copolymers of the present invention, particularly those having a polyethylene backbone and polystyrene sidechains, modifies the physical properties of polyethylene without affecting the beneficial crystalline properties of polyethylene.

As it is illustrated in Example 24, sidechain polymers having a high Tg, such as polystyrene can be replaced with low Tg polymers such as polybutadiene and predominantly cis-polyisoprene. For example, isoprene can be anionically polymerized with secondary butyl lithium, preferably to a molecular weight of about 15,000 and terminated with allyl chloride. Alternatively, the rubbery living polymer can be capped with an alkylene oxide such as ethylene oxide followed by termination with allyl chloride, methallyl chloride, or methacrylyl chloride to obtain low Tg macromolecular monomers. The alpha-olefin terminated (allyl chloride and anionically polymerized isoprene) can be used to prepare super impact polyethylene or polypropylene copolymers utilizing known polymerization techniques. For example, the alpha-olefin terminated polyisoprene referred to above can be copolymerized with ethylene using a Ziegler type catalyst system or with propylene using a Natta type catalyst system.

Still another alternative illustrated in the examples includes the use of hydrocarbon monomers which produce rubbery polymers in the backbone of the copolymer. Included among these monomers are isobutylene, butadiene, isoprene, ethylene-propylene comonomers, etc. The physical properties of the rubbery backbone polymers are enhanced by copolymerization or incorporation into the backbone polymer a wide variety of macromolecular monomers, such as linear polymers anionically polymerized from styrene, alpha-methylstyrene, ethylene oxide, 4-vinyl pyridine, methacrylonitrile, N,N-dimethylacrylamide, methyl methacrylate, etc. A preferred example being the macromolecular monomer of Example 24(a) wherein the polystyrene capped with butadiene or isoprene is terminated with either allyl chloride or 2-bromomethyl5-norbornene. The latter end group is particularly useful in preparing an ethylene-propylene backbone graft copolymer following the procedure of Examples 17 and 18.

As it can be seen from the above, the present invention provides a convenient and economical means for preparing copolymers utilizing a large variety of hydrocarbon monomers in forming the backbone polymeric blocks and a wide variety of anionically polymerizable monomers in forming the sidechain polymers. The copolymerization is facilitated by a judicious selection of the terminal end group on the anionically polymerized polymer. Thus, the problem of copolymerizing incompatible polymers is solved providing an economical means for preparing copolymers having a backbone and sidechain polymer designed to fit one's needs and the particular end product desired.

EXAMPLE 25

Preparation Of Graft Copolymer From Polystyrene Terminated With Vinyl-2-Chloroethyl Ether And Ethyl Acrylate To a solution of 18 grams of octylphenoxy polyethoxy ethanol (emulsifier) in 300 grams of deionized water there is added, with vigorous agitation in a Waring Blender, a solution of 30 grams of the polystyrene product of Example 7(a) and 70 grams of ethyl acrylate. The resulting dispersion is purged with nitrogen, then heated with stirring at 65°C, whereupon 0.1 gram of ammonium persulfate is added to initiate polymerization. Thereupon, 200 grams of ethyl acrylate and 0.5 gram of 2 percent aqueous ammonium persulfate solution are added portionwise over a period of three hours, the temperature being maintained throughout at 65°C. The resulting graft copolymer emulsion is cast on a glass plate and allowed to dry in air at room temperature to a flexible self-supporting film. The film is shown to contain polystyrene segments by extraction with cyclohexane which dissolves polystyrene; the cyclohexane extract on evaporation yields no residue.

EXAMPLE 26

Preparation Of Graft Copolymer Of Poly(alpha-methylstyrene) Terminated With Vinyl Chloroacetate And Butyl Acrylate A solution of 50 grams of poly(alpha-methylstyrene) macromer terminated with vinyl chloroacetate and having an average molecular weight of 12,600 and 450 grams of butyl acrylate in 1,000 grams of toluene is purged with nitrogen at 70°C, then treated with 1 gram of azobisisobutyronitrile. The temperature is maintained at 70°C for 24 hours to yield a solution of graft copolymer which is cast as a film on a glass plate. The dried film is slightly tacky and is shown to contain polystyrene segments by extraction with cyclohexane and evaporation of the cyclohexane extract, as above.

EXAMPLE 27

Preparation Of Graft Copolymer Of Polystyrene Macromolecular Monomer Terminated With Methacrylyl Chloride And Ethyl Acrylate A mixture of 21 grams of polystyrene Macromolecular Monomer terminated with methacrylyl chloride and having an average molecular weight of 10,000 prepared as in Example 6, 28 grams of ethyl acrylate and 0.035 gram of azobisisobutyronitrile is prepared at room temperature and kept for 18 hours, under nitrogen, at 67°C. The resulting product is a tough, opalescent material which can be molded at 160°C to give a clear, tough, transparent sheet.

EXAMPLE 28

Homopolymerization Of Methacrylate Terminated Polystyrene

The methacrylate terminated polystyrene of Example 8 is subjected to homopolymerization conditions by suspension polymerization as follows:

| Aqueous Solution: | |
|---|---|
| 5% Lemol 42-88 (Polyvinyl alcohol) | 3.0 g. |
| Distilled water | 300.0 g. |
| Monomer Solution: | |
| Methacrylate terminated polystyrene | 20.0 g. |
| Lauroyl peroxide | 0.16 g. |
| Benzene (thiophene-free) | 30.0 g. |

The aqueous polyvinyl alcohol solution is charged into a clean quart bottle and sparged with nitrogen for 15 minutes. The methacrylate terminated polystyrene macromolecular monomer solution is added to the bottle, and the bottle is capped after flushing with nitrogen for 2 minutes. The bottle is placed in a 70°C bottle polymerization bath for 17 hours.

The product is filtered, dried, and dissolved in tetrahydrofuran (THF) for Gel Permeation Chromatography (GPC) analysis. No gel is found in the THF solution. In the GPC chromatogram, the ratio of the area of the unreacted macromolecular monomer peak at 32 counts to the total peak area showed that 75.9 percent of the macromolecular monomer remained unreacted. The analysis of the GPC, therefore, reveals that only 24 percent of the macromolecular monomer reacted, and this conversion resulted only in a low molecular weight polymer.

EXAMPLE 29

Polymerization Of Acrylates In The Presence Of Polystyrene

This example illustrates that a polystyrene does not graft to an acrylate backbone at the polystyrene segment, establishing that the macromolecular monomers of the invention copolymerize with acrylates and other polymerizable monomers through the terminal double bond.

The attempted polymerization was conducted in a stirred 3-neck flask fitted with a condenser by the following recipe and procedure:

| Polymerization Recipe | |
|---|---|
| Polystyrene[1] | 18.0 g. |
| Ethyl acrylate (R & H No. 3871) | 42.0 g. |
| AIBN (VAZO) | 0.168 g. |
| Benzene (thiophene-free) | 120.0 g. |
| DMSO (reagent grade) | 120.0 g. |

[1]Living polystyrene having a molecular weight of about 10,000 terminated with methanol.

The materials are charged into the flask and the clear solution is heated under a slow flow of nitrogen for 13 hours at room temperatures of 61°C to 80°C. After completion, the polymer solution has a total solids content of 19.6 percent (theoretical: 20.0 percent).

The product mixture is precipitated and dissolved in THF for GPC analysis. The unreacted polystyrene is determined from the area of the polystyrene peak in the GPC chromatogram of a known sample weight injected, and using the polystyrene peak area/gram calibration from polystyrene standards shown in the following Table.

TABLE 1

| | GPC Determination Of Unreacted Polystyrene | | |
|---|---|---|---|
| Wt. Product Injected (Grams) | Polystyrene Peak Area (Grams) | Unreacted Polystyrene In Injected Sample[a] (Grams) | Unreacted Polystyrene In Product % |
| 0.008039 | 0.1778 | 0.00268 | 33.3 |

[a]Calculated from standard 66.5 g. area/1.000 g. polystyrene

The above determination shows that the polymer product contained 33.3 percent unreacted polystyrene. Therefore, little or no grafting of ethyl acrylate to polystyrene macromolecular monomer occurred during the polymerization.

EXAMPLE 30

Preparation Of Graft Copolymer Having Polystyrene Sidechains And Poly(butyl acrylate) Backbone The following ingredients are charged into a quart bottle which had been washed, dried, capped and flushed with nitrogen.

| | |
|---|---|
| Methacrylate terminated polystyrene (prepared by procedure of Example 8, except that $\bar{M}n$= 11,000) | 15.0 g. |
| Butyl acrylate (Rohm & Haas 3480) | 45.0 g. |
| AIBN (VAZO) | 0.09 g. |
| DMSO (reagent grade) | 195.0 g. |
| Benzene (thiophene-free) | 195.0 g. |

The methacrylate terminated polystyrene is first dissolved in the benzene/DMSO solution, followed by dissolving the butyl acrylate and VAZO in the solution. The homogeneous solution is introduced into the nitrogen filled bottle via syringe. The bottle is placed in a 67°C bottle polymerization bath and rotated at 30 rpm. Samples are removed by syringe and short stopped with 10 percent MEHQ at 75 minutes, 120 minutes and 210 minutes. At 300 minutes polymerization time, the remainder of the bottle is short stopped with 4 drops 10 percent MEHQ in ethanol.

The butyl acrylate conversions are obtained by total solids determination on portions of the samples. The remainder of the samples are precipitated in methanol, dried, and dissolved in THF for GPC analysis. The methacrylate terminated polystyrene has a peak at 31 counts on the GPC chromatogram. The GPC chromatograms of products of 75, 120, 210 and 300 minutes shows the disappearance of the peak at 31 counts. Analysis of the GPC chromatograms revealed that 25.6 percent of the graft copolymer is polystyrene and 74.4 percent is poly(butyl acrylate).

The above procedure is repeated several times using the same methacrylate terminated polystyrene having a molecular weight of 11,000 and a $\overline{Mw}/\overline{Mn}$ of less than about 1.1, by copolymerizing increased amounts of butyl acrylate, replacing butyl acrylate with ethyl acrylate and methyl methacrylate. Table 2 below summarizes the results of these copolymerizations.

The resulting graft copolymer is recovered by precipitation of of part of the copolymer in methanol and the other part in cyclohexane to give a combined yield of 87 percent. Clear, brittle films are obtained from the cyclohexane - or methanol - precipitated products. The methacrylate terminated polystyrene alone has a peak at 32 counts on the chromatogram of the GPC. However, a GPC chromatogram on the unworked-up product of the graft copolymer illustrates that no unreacted methacrylate macromolecular monomer is detectable at 32 counts. Therefore, it must be assumed that all of the methacrylate terminated polystyrene copolymerized with the methyl methacrylate.

EXAMPLE 32

Preparation Of Graft Copolymer Having Polystyrene Sidechains And Poly(butyl acrylate) Backbone By Suspension Copolymerization By employing the same methacrylate terminated polystyrene used in Example 30 (i.e., M.W. = 11,000 and $\overline{Mw}/\overline{Mn}$ less than about 1.1, prepared by the procedure of Example 8), the following ingredients are charged with a clean, capped, nitrogen purged quart bottle:

| | |
|---|---|
| Distilled water | 150.0 g. |
| Lemol 42–88 (5% solution of polyvinyl alcohol) | 3.0 g. |
| Disodium phosphate | 0.80 g. |
| Monosodium phosphate | 0.05 g. |

TABLE 2

Compositions Of Methacrylate Terminated Polystyrene-Acrylic Copolymers Prepared In DMSO/Benzene Solution

| Comonomer | % Macromolecular Monomer in Monomer Feed | Polymerization Time, Hours | Comonomer Conversion % | Macromolecular Monomer Conversion % | Copolymer Composition (% Macromolecular Monomer) |
|---|---|---|---|---|---|
| BA | 25 | 2 | 36.2 | 37.3 | 25.6 |
|  |  | 3.5 | 62.3 | 65.7 | 26.0 |
|  |  | 5 | 75.6 | 85.5 | 27.4 |
| BA | 50 | 2 | 13.5 | 18.4 | 57.7 |
|  |  | 4.75 | 67.0 | 77.0 | 53.5 |
| EA | 25 | 2 | 23.2 | 30.1 | 30.2 |
|  |  | 3.5 | 58.3 | 67.2 | 27.8 |
|  |  | 5 | 77.6 | 90.4 | 28.0 |
| EA | 50 | 4.75 | 69.0 | 80.7 | 53.9 |
| MMA | 25 | 2 | 15.5 | 10.3 | 18.2 |
|  |  | 5 | 48.3 | 53.4 | 26.9 |
| MMA | 50 | 2 | 12.0 | 22.9 | 65.6 |
|  |  | 4.75 | 35.7 | 32.0 | 47.3 |

(a) S11MA = Methacrylate terminated polystyrene, 11,000 $\overline{Mn}$ methacrylate terminal group
EA = Ethyl Acrylate
BA = Butyl Acrylate
MMA = Methyl Methacrylate

EXAMPLE 31

Preparation Of Graft Copolymer Having Polystyrene Sidechains And Poly(methyl methacrylate) Backbone The following ingredients are charged into a clear quart bottle, capped, purged with nitrogen, and polymerized for 17½ hours in a 74°C bottle polymerization bath.

| | |
|---|---|
| Methacrylate terminated polystyrene (product of Example 8) | 27.5 g. |
| Methyl methacrylate | 110.0 g. |
| Benzene (thiophene-free) | 413.0 g. |
| AIBN (VAZO 64) | 1.10 g. |
| t-Dodecyl mercaptan | 0.70 ml. |

Thereafter, the following solution is introduced into the bottle via syringe:

| | |
|---|---|
| Methacrylate terminated polystyrene | 20.0 g. |
| Butyl acrylate | 30.0 g. |
| Lauroyl peroxide | 0.1 g. |

The bottle is rotated for 16 hours, at 65°C, followed by heating for 2–3 hours at 86°C. The product beads are washed with water, filtered and dried. The molded film is clear, rubbery, and strong. The transparency of the film indicates that little unreacted methacrylate terminated polystyrene is present.

Unlike copolymerization in DMSO/benzene solution, the reactivity of methacrylate terminated polystyrene with acrylic monomers in suspension polymerization is that predicted from literature reactivity ratios. It is seen in Table 3 below that the polymerizable macromolecular monomer has a greater relative reactivity than the butyl acrylate monomer. The relative reactivity ratio, $r_2$, of the methacrylate terminated polystyrene ($M_1$) with butyl acrylate ($M_2$) is about 0.4 (Table 3). This corresponds with the literature value of 0.37 for methyl methacrylate/butyl acrylate.

TABLE 3

Composition Of Methacrylate Terminated Polystyrene-Butyl Acrylate Copolymers Prepared By Suspension Polymerization

| % Macromolecular Monomer In Monomer Feed | Polymerization Time, Minutes | Butyl Acrylate Conversion % | Macromolecular Monomer Conversion % | Copolymer Composition (% Macromolecular Monomer) | $r_2=$ % BA Conversion % Macromolecular Monomer Conversion |
|---|---|---|---|---|---|
| 30 | 90 | 29.2 | 47.0 | 41.5 | 0.6 |
|  | 135 | 60.4 | 79.6 | 35.6 |  |
|  | 180 | 68.9 | 81.9 | 33.1 |  |
| 50 | 45 | 7.0 | 15.5 | 68.9 | 0.45 |
|  | 90 | 10.1 | 26.3 | 71.9 | 0.38 |
|  | 135 | 67.4 | 81.0 | 54.6 |  |
|  | 180 | 79.0 | 85.6 | 52.0 |  |

EXAMPLE 33

Preparation Of Graft Copolymer Having Polystyrene Sidechains And Ethyl Acrylate/Butyl Acrylate Backbone By Suspension Copolymerization A suspension copolymerization using a methacrylate terminated polystyrene prepared by the procedure of Example 8 having a molecular weight of about 16,000 and a $\overline{M}w/\overline{M}n$ of less than about 1.1 is conducted by the procedure described below. An aqueous solution and a monomer solution were both freshly prepared before use. The ingredients of the aqueous stabilizer solution and monomer solution are as follows:

Aqueous Stabilizer Solution:

| | |
|---|---|
| Distilled water | 300.0 g. |
| 5% Lemol 42-88 polyvinyl alcohol solution (Borden) | 3.0 g. |
| Disodium phosphate | 1.6 g. |

Monomer Solution:

| | |
|---|---|
| Methacrylate terminated polystyrene | 30.0 g. |
| Ethyl acrylate (Rohm & Haas) | 35.0 g. |
| Butyl acrylate (Rohm & Haas) | 35.0 g. |
| Benzene (thiophene-free) | 14.0 g. |
| Lauroyl peroxide | 0.084 g. |

The 5 percent polyvinyl alcohol solution is prepared by dissolving Lemol 42-88 is distilled water. The aqueous stabilizer solution is charged to a rinsed quart bottle, and the bottle is capped with a butyl rubber gasketed cap having a Mylar film lining. The bottle is purged with nitrogen via syringe needle before introducing the monomer solution.

The monomer solution is then charged to the bottle with a hypodermic syringe, and the bottle is placed in a bottle polymerization bath and rotated at 30 rpm at 55°C for 16 hours. The polymerization reaction is completed using the following temperature cycle. The bath temperature is raised to 65°C for 3 hours, 80°C for one hour and 4 hours at 92°–95°C. The suspension is then cooled, filtered, washed with water and dried at ambient temperature.

The beads are milled for 2 minutes at 145°C roll temperature for analysis and physical testing. The yield is 91.6 percent of theoretical (there is some loss of material during milling). The amount of unreacted methacrylate terminated polystyrene in the product is 3.3 percent.

The samples are prepared for physical testing by briefly milling the dried polymer beads prior to molding specimens in order to eliminate insoluble gel. The milled products are dissolved in THF for GPC determination for unreacted methacrylate terminated polystyrene. The molded specimens which had not undergone shearing by milling did not generally develop optimum physical properties. All products for analysis are milled 2 minutes on a lab mill with a tight nip and 145°C roll temperature. Specimens for tensile testing are compression molded for 10 minutes at 170°C and 1100 psi. Only contact pressure is applied until the platens reach the required temperature, then full pressure is applied to the mold. Pressure is maintained while cooling the mold to prevent the formation of bubbles.

The molded sheets (19 mils) of the 30 percent incorporated methacrylate terminated polystyrene copolymer of this example are tough and transparent and the properties are described in Table 4 below.

TABLE 4

Properties Of 30% Methacrylate Terminated Polystyrene Copolymer With 1:1 EA:BA

| | |
|---|---|
| Unreacted macromolecular monomer (%) | 3.3 |
| THF-insoluble gel content of milled and molded sample, % | 0.4 |
| Tg of acrylic elastomer component by DSC, °C | −37 |
| Water absorption, 24 hours, % approximately | 0.3 |
| Yield strength, psi (a) | 360 |
| Tensile strength, psi (a) | 1630 |
| Ultimate elongation, % (a) | 475 |
| Tensile set (% increase of original length) (a) | 35 |

(a) Tensile testing was conducted on Instron at 10 inches/minute crosshead rate.

EXAMPLE 34

Preparation Of Graft Copolymer Having Polystyrene Sidechains And Poly(butyl acrylate) Backbone By Suspension Copolymerization A 2-liter glass resin kettle (5 inch diameter) emersed in a temperature controlled water bath is charged with 600 grams of an aqueous stabilizer solution containing 600 grams of distilled water, 3.0 grams of 5 percent Lemol 42-88 polyvinyl alcohol solution (Borden), and 3.20 grams of disodium phosphate. The reactor is equipped with a condenser, thermometer, nitrogen inlet, and a stirrer with a 4-3/8 inch crescent shaped 1-piece Teflon paddle. While heating up the aqueous solution, the reactor is purged with nitrogen at 100-200 ml./min. for 50 minutes. The nitrogen flow is reduced, and 225.2 grams of a monomer solution is charged to the reactor. The monomer solution consists of 60.0 grams of a methacrylate terminated polystyrene prepared by the procedure of Example 8 and having a molecular weight of about 11,000, 140.0 grams of butyl acrylate, 28.0 grams of benzene (thiophene-free), and 0.280 gram of lauroyl peroxide (Alperox, Lucidol). The stirrer is adjusted so the blade is 1.5 inches below the surface, and stirring is started at 300 rpm, then reduced to 230 rpm. (Monomer pooling is observed at slower stirring speeds.) The bath temperature is maintained at 62°C with an internal temperature of 60°-61°C. After 1½ hours, monomer droplets are observed as being converted into beads. The internal temperature is raised to 90°C after 5½ hours, and the polymerization is finished in another 1 1/2 hours. The product is filtered through a 60-mesh screen, washed with distilled water and allowed to dry at room temperature. The weight of the dried polymer beads (5-12 mm. length, 3-4 mm. diameter) is 190.7 grams. After milling (2 minutes at 145°C) then molding of the product for 10 minutes at 170°C, a transparent elastomer is obtained.

Table 5 below illustrates the physical properties obtained by copolymerizing the macromolecular monomers of the present invention prepared by suspension polymerization by the procedure in the examples above.

1). The reasons for this behavior of the methacrylate terminated macromolecular monomer is not understood, but the effect is reproducable. The results of these experiments indicate that with very large monomers, e.g., the macromolecular monomers in very low molar concentrations, a Poisson distribution of segments can be achieved. This distribution permits the synthesis of predictable, uniform graft polymer structures. It is shown in Table 3 that the $r$ values correspond to the literature r values in this type of copolymerization.

It can be seen from the table that at low macromolecular monomer levels (20-30 percent) the products are thermoplastic elastomers with good recovery. At 30-45 percent marcomolecular monomer contents, the products are flexible thermoplastics with increasing tensile strength and yield strength, and decreasing elongation and recovery, as the macromolecular monomer content increases.

As it would be expected, the macromolecular monomer/acrylate copolymers have many potential uses as thermoplastic elastomers. For example, emersion of a macromolecular monomer/EA/BA terpolymer in machine oil for 5 days at room temperature produces a weight increase of only 0.9 percent. The strength and recovery of the specimen appears to be uneffected by the emersion in oil. The estimated use temperature range of this thermoplastic elastomer is about −30°C to +50°C. Oil resistance and brittle temperatures can be modified by comonomer composition used in the macromolecular monomer copolymerizations. The use of macromolecular monomers with higher glass transition temperatures than polystyrene will produce a significant increase in the upper temperature limits of these products.

These products have been found to be useful in numerous applications such as gaskets, O-rings, sealants, adhesives, etc., in contact with hydrocarbon solvents and oils, water, glycols, etc. The capability of being in-

TABLE 5

Physical Properties Of Macromolecular Monomer/Acrylic Copolymers[a]

| Macro-[c] molecular Monomer Type Wt. % | Comonomer | Yield Strength (psi) | Tensile Strength (psi) | Elongation (%) | Permanent Set (%) | Immediate[b] Recovery (%) |
|---|---|---|---|---|---|---|
| S11MA 20 | 1:1 EA:BA | — | 820 | 800 | 0-2 | 98.5 |
| S11MA 25 | 1:1 EA:BA | 130 | 1420 | 790 | 5 | 95 |
| S11MA 30 | 1:1 EA:BA | 380 | 1500 | 810 | 40 | 87 |
| S11MA 35 | 1:1 EA:BA | 560 | 1930 | 560 | 50 | 77 |
| S16MA 25 | 1:1 EA:BA | — | 1310 | 730 | 10 | 96.8 |
| S16MA 25 | 2:1 EA:BA | — | 1800 | 700 | 23 | 91 |
| S16MA 30 | 1:1 EA:BA | 270 | 1660 | 550 | 22 | 91 |
| S16MA 40 | 1:1 EA:BA | 1220 | 2170 | 400 | 108 | — |
| S16MA 45 | 1:1 EA:BA | 1760 | 2490 | 350 | 128 | — |
| S11MA 45 | EA | 2090 | 2400 | 290 | 140 | — |
| S16MA 53 | BA | 2540 | 2030 | 276 | 105 | — |
| S16MA 50 | 1:1 EA:BA | 2680 | 2950 | 240 | 125 | — |

[a]Specimens 18-19 mils thickness pulled on Instron at 10 inches/minute.
[b] % Recovery =[% Elongation - % Set/% Elongation]× 100
[c]S11MA = Polystyrene, 11,000 molecular weight, methacrylate terminal group. S16MA = Polystyrene, 16,000 molecular weight methacrylate terminal group.

The examples (Examples 30 & 31) above illustrate that the polymerizable macromolecular monomer of the present invention copolymerizes and is incorporated into the bakcbone polymer at a uniform rate that does not change with conversion (Table 2). This data (Table 2) illustrate that the initial composition of the copolymer is the same as the initial charge ratio ($r_2 =$ jection molded, and the lack of extractable curing ingredients are among the advantages offered by the novel macromolecular monomer graft copolymers of the invention.

EXAMPLE 35

Preparation Of Graft Copolymer Having Polystyrene

Sidechains And Poly(butyl acrylate) Backbone Prepared By Latex Copolymerization

Stable latexes are prepared by copolymerization of a methacrylate terminated polystyrene macromolecular monomer prepared by the procedure of Example 8 and having a molecular weight of about 13,000 with acrylic monomers is accomplished by the following recipe and procedure.

| Solution A: | |
|---|---|
| Distilled water (boiled, nitrogen purged) | 476.0 g. |
| Sodium bicarbonate solution (5%) | 16.0 g. |
| Igepal CO-880 solution (10% aqueous solution, GAF) | 80.0 g. |
| Solution B: | |
| Butyl acrylate | 280.0 g. |
| Methacrylate terminated polystyrene (M.W. = 13,000, Mw/Mn = 1.1) | 120.0 g. |
| Toluene | 40.0 g. |
| Ninate 401 (60% active, Stepan, calcium dodecylbenzene sulfonate) | 13.6 g. |
| t-Dodecyl mercaptan | 0.20 ml. |
| Solution C: | |
| Lauroyl peroxide solution (1.6 g. in 20.0 g. toluene) | 21.6 g. |

The molecular weights of the copolymer products can be increased by elimination of mercaptan in the recipe.

The emulsion is prepared in a 1.5 liter SS beaker, cooled in an ice bath and made with a Type CS 4AMP 8,000 rpm Black and Decker homogenizer. Solution A is placed in the beaker and a nitrogen purge is started. The homogenizer is started and Solution B is introduced in one minute and stirred for an additional 10 minutes. Solution C is thereafter added and the entire contents stirred for an additional 2 minutes.

The above emulsion is charged into a 2-liter glass resin kettle fitted with four baffles six inches by one-fourth inch and stirred with a 3 inch diameter six blade turbine agitator. Nitrogen purge and stirring (500 rpm) are started while the temperature is raised to and held at 67°C. After 5 minutes at 500 rpm, the speed of the agitator is reduced and held at 175 rpm. After 19 hours at this temperature, the reactor contents are cooled to room temperature. The latex is filtered through cloth. The resulting polymer has a total solids content of 39.2 percent and a Brookfield viscosity at 25° LV1 60 rpm) of 11.9 cps, a particle size of 2 microns, a pH of 7.6 and a freeze-thaw stability of 2 cycles. Analysis reveals that only 1.5 percent of the methacrylate terminated polystyrene remained unreacted.

EXAMPLE 36

Preparation Of Graft Copolymer Having Polystyrene Sidechains And Poly(butyl acrylate/Poly(ethyl acrylate) Copolymeric Backbone By Latex Copolymerization A latex copolymerization employing the same procedure as described in Example 35 above is employed with respect to the following recipe.

| Solution A: | |
|---|---|
| Distilled water (boiled, nitrogen purged) | 401.5 g. |
| Sodium bicarbonate (5% solution) | 17.6 g. |
| Igepal CO-880 solution (10% aqueous solution, GAF) | 77.0 g. |
| Solution B: | |
| Ethyl acrylate | 154.0 g. |
| N-butyl acrylate | 154.0 g. |
| Methacrylate terminated polystyrene (M.W. = 13,000) | 132.0 g. |
| Xylene | 44.0 g. |

| Solution B—Continued | |
|---|---|
| Ninate 401 (60% active, stepan calcium dodecylbenzene sulfonate) | 12.9 g. |
| t-Dodecyl mercaptan | 0.07 ml. |
| Solution C: | |
| Lauroyl peroxide solution (0.9 grams in 22.0 grams xylene) | 22.9 g. |

As pointed above, the emulsion is prepared in the same manner as described in Example 35; however, the polymerization is run at 55°C for 4 hours and finished at 95°C for 2 hours. The solids content of the butyl acrylate/ethyl acrylate/macromolecular monomer polymer latex is 43.6 percent and has a particle size of 3-4 microns and a pH of 7.5. There is no coagulum in the latex polymer, just as there was none in the polymer prepared in Example 35.

The graft copolymers prepared in the manner described in Example 35 and Example 36 had physical properties similar to those prepared by suspension polymerization described above.

EXAMPLE 37

Preparation Of Graft Copolymer Having Polystyrene Sidechains And Polyacrylonitrile Backbone A solution consisting of 30.0 grams of a methacrylate terminated polystyrene prepared by the procedure of Example 8 and having a molecular weight of 11,000 dissolved in 120.0 grams of dimethyl formamide containing 0.10 gram of AIBN (VAZO 34) are charged into a quart bottle. The bottle is capped, and purged with nitrogen for 15 minutes. 31.5 Grams of acrylonitrile is syringed into the bottle, and the clear solution is rotated for 18 hours at 67°C in a bottle polymerization bath. The bottle is then post-heated for 5 hours at 90°–95°C. The viscous solution is then diluted with dimethyl formamide and the product recovered as a powder by precipitation into methanol. A film molded for 5 minutes at 150°C had good flow properties and was yellow, but clear. The absence of opacity in the molded film clearly demonstrates that little or no unreacted polystyrene macromolecular monomer was present, since polyacrylonitrile products containing unreacted polystyrene are cloudy or opaque.

EXAMPLE 38

Preparation Of Graft Copolymer Having Polystyrene Sidehcains And Polyvinyl Chloride Backbone A methacrylate terminated polystyrene prepared by the procedure of Example 8 and having a molecular weight of about 16,000 and an $\overline{M}w/\overline{M}n$ of less than about 1.1, is copolymerized essentially to completion with vinyl chloride by charging the following ingredients in order into a quart bottle.

| Distilled water | 300.0 g. |
|---|---|
| Lemol 42-88, 5% solution (PVAL) | 3.0 g. |
| Disodium phosphate | 0.40 g. |
| Lauroyl peroxide | 0.34 g. |
| Methacrylate terminated polystyrene | 14.56 g. |
| Vinyl chloride | 85.4 g. |

The methacrylate terminated polystyrene and lauroyl peroxide are added to the aqueous solution of distilled water, Lemol and disodium phosphate and the quart bottle is chilled in ice water. Vinyl chloride is condensed in the bottle, and allowed to evaporate to the correct weight to drive out air. Then, the bottle is immediately capped with a butyl rubber gasketed, Mylar-lined cap. The bottle is rotated in a 55°C bottle polymerization bath and after 19 hours in the polymerization bath, the excess vinyl chloride is bled off and the solids content in the bottle is filtered in a Buchner funnel and rinsed with distilled water. A yield of 92.5 grams of graft copolymer is obtained, which corresponds to a 91.2 percent vinyl chloride conversion. A GPC chromatogram of the product reveals that no detectable unreacted methacrylate terminated polystyrene occurs at 30.5 counts. (The peak on the GPC chromatogram for the methacrylate terminated polystyrene having a molecular weight of 16,000 is 30.5 counts.) Accordingly, it is shown that copolymerization of the methacrylate terminated polystyrene with vinyl chloride is essentially complete.

EXAMPLE 39

Preparation Of Graft Copolymer Having Polystyrene Sidechains And Polyvinyl Chloride Backbone A graft copolymer of the methacrylate terminated polystyrene having a molecular weight of about 11,000 and prepared by the procedure in Example 8 with vinyl chloride is prepared by suspension copolymerization using the following recipe and procedure.

| Solution A: | |
|---|---|
| Distilled water | 150.0 g. |
| 5% Lemol 42-88 polyvinyl alcohol | 1.5 g. |
| Disodium phosphate | 0.2 g. |
| Solution B: | |
| Methacrylate terminated polystyrene | 50.0 g. |
| Lauroyl peroxide | 0.125 g. |
| Vinyl chloride | 50.0 g. |

Into each of three quart bottles there is charged 150 grams of stock solution A above, and the solution is sparged with nitrogen for 30 minutes. The methacrylate terminated polystyrene and lauroyl peroxide are added, and the bottle is chilled in ice water. A slight excess of vinyl chloride is condensed in the bottle, and allowed to evaporate to the correct weight to drive out air. Then the bottle is immediately capped with butyl rubber gasketed, Mylar-lined cap. The bottles are rotated in a 50°C bottle polymerization bath at 30 rpm. Bottles are removed from the bath at 2.5 hours, 5 hours, and 15.5 hours, and vinyl chloride is bled immediately upon removal of each bottle. The solids content of each bottle is filtered in a Buchner funnel and rinsed with distilled water. The product is first dried in air, then dried in vacuum oven at 50°C.

Each of the total product mixtures is dissolved in THF. One portion of the THF solution is used for GPC analysis, and the other portion of the solution is added to excess 3:2 cyclohexane:hexane to precipitate the copolymer. The precipitate is filtered and washed with 3:2 cyclohexane:hexane solvent to remove unreacted macromolecular monomer. The purified copolymer is dried, and submitted for chlorine analysis. The copolymer compositions calculated from the chlorine contents of the fractionated products are presented in Table 6 below.

TABLE 6

Copolymer Compositions of 50/50 Methacrylate Terminated Polystyrene/Vinyl Chloride Monomer Charge At Various Conversions

| Polymerization Time, Hours | VCl Conversion[a]% | Copolymer Composition | |
|---|---|---|---|
| | | % Macromolecular Monomer (From Cl Analysis) | % Macromer (by GPC) |
| 2.5 | 4.6 | 94 | 87 |
| 5.0 | 9.8 | 88 | 89 |
| 15.5 | 55.4 | 54 | 63 |

[a]Calculated from product yield.

The unfractionated portions of the THF solutions are filtered and measured. Volumes of the solutions of known solids are injected into the GPC. The unreacted methacrylate terminated polystyrene peaks at 31.4 counts of the chromatograms are cut out, weighed, and unreacted macromolecular monomer in the samples is determined. The copolymer compositions calculated from the GPC data compare well with those calculated from chlorine analysis and these calculations are also presented in Table 6.

As it can be seen from the above examples, the polymerizable macromolecular monomers of the present invention offer a convenient route to the preparation of polystyrene graft copolymers with vinyl chloride. These graft copolymers with vinyl chloride do not require processing aids, since the melt flow of the graft product is improved over the PVC homopolymer. Even with low levels of macromolecular monomer copolymerized with vinyl chloride, milled sheets and molded specimens have greater clarity than PVC homopolymer controls.

Macromolecular monomers of the present invention can be copolymerized with vinyl chloride in solution, bulk, or in conventional suspension polymerization systems with free-radical initiators. The methacrylate terminated polystyrene macromolecular monomers have been copolymerized with vinyl chloride by suspension polymerization at macromolecular monomer levels of 10% to 50%. The copolymer compositions of the low and intermediate conversion samples have been determined by GPC analysis of the polymer mixture, and by chlorine analysis of the fractionated samples. A series of GPC chromatograms of the product mixtures of polymerizations of a 50/50 macromolecular monomer/VCL monomer charge at various vinyl chloride conversions have been made. Analysis of these chromatograms reveals that the macromolecular monomer peak at 31.4 counts disappears rapidly early in the polymerization. In all these copolymerizations, it has been found that most of the methacrylate terminated polystyrene copolymerizes at 10-20 percent vinyl chloride conversion. Some low conversion copolymer compositions of several monomer feed compositions, calculated from GPC and product yield data are presented in Table 7. The last column in this Table gives the theoretical instantaneous copolymer composition calculated from the Alfrey-Goldfinger copolymerization equation (2), assuming literature r values of methyl methacrylate ($M_1$), and vinyl chloride ($M_2$) for methacrylate terminated polystyrene and vinyl chloride, respectively ($r_1 = 10$, $r_2 = 0.1$). It can be seen from this data that the copolymer compositions correspond reasonably well to the theoretical values, within the limits of experimental accuracy set by the very low molar concentrations of the macromolecular monomer double bond.

The relative reactivities of vinyl chloride with vinyl ether-terminated macromolecular monomers and with maleic half ester-terminated macromolecular monomers prepared by the procedure described in Examples 5 and 9, respectively, have also been determined. The vinyl chloride conversion and reactivity ratio data with the various macromolecular monomers are summarized in Table 8. The vinyl ether terminated macromolecular monomer appears to copolymerize uniformly with vinyl chloride ($r_2 = 1$). The methacrylate terminated macromolecular monomer and maleic half ester-terminated macromolecular monomer copolymerize with vinyl chloride, as predicted from literature reactivity ratios of methyl methacrylate or maleic esters with vinyl chloride. Although the macromolecular monomers are incorporated at much faster rates than vinyl chloride and give compositionally heterogeneous copolymers without resorting to special polymerization techniques such as gradual addition, the copolymerization studies of the methacrylate or maleic half ester terminated macromolecular monomers and vinyl chloride serves to show that, in these systems, the terminal groups of the macromolecular monomers are governed by the same copolymerization kinetics as the corresponding low molecular weight monomers.

TABLE 7

Copolymer Compositions In Methacrylate Terminated Polystyrene ($M_1$) Copolymerization With Vinyl Chloride ($M_2$)

| Sample No. | Macromolecular Monomer In Monomer Feed % | Vinyl Chloride Conversion % | Macromolecular Monomer Conversion(a) % | Copolymer Composition (% Macromolecular Monomer) | Theoretical Copolymer Composition For $r_1 = 10$, $r_2 = 0.1$ (Macromolecular Monomer)(c) |
|---|---|---|---|---|---|
| 17-31 | 23.7 | 12.2 | 85.9 | 68.7 | 75.6 |
| 1-41 | 35.0 | 8.3 | 77.9 | 83.5 | 84.4 |
| 17-32 | 42.8 | 20.6 |  | 74.0(b) |  |
| 1-43 | 50.0 | 4.6 | 31.9 | 87.4 | 90.9 |
|  |  | 9.8 | 83.0 | 89.4 |  |

(a) Calculated from GPC chromatograms.

(b) Calculated from chlorine analysis of the fractionated product.

(c) Calculated from the Alfrey-Goldfinger Equation 
$$\frac{d[M_1]}{d[M_2]} = \frac{[M_1]}{[M_2]} \cdot \frac{r_1 \frac{[M_1]}{[M_2]} + 1}{\frac{[M_1]}{[M_2]} + r_2}$$

EXAMPLE 40

Preparation Of Graft Copolymer Having Polyisoprene Sidechains And Polystyrene Backbone A 370 gram charge of the 7.1% methacrylate terminated polyisoprene macromolecular monomer prepared in Example 11 is vacuum stripped 1½ hours at 50°C on a rotary evaporator (6.1 grams of heptane is not removed by stripping). The round bottomed flask containing the concentrated macromolecular monomer is sealed with a septum and purged with nitrogen. A solution consisting of 61.2 grams of styrene, 6.1 grams benzene (thiophene-free) and 0.31 gram of

TABLE 8

Copolymer Compositions In Macromolecular Monomer ($M_1$) Copolymerization with Vinyl Chloride ($M_2$)

| Macromolecular Monomer % In Monomer Feed | Type Macromolecular Monomer | VCl Conversion % | Macromolecular Conversion % | Copolymer Composition (% Macromolecular Monomer) | $r_2$ = % VCl Conversion % Conversion Macromolecular Monomer |
|---|---|---|---|---|---|
| 15 | S10VE | 12.5 | 9.2 | 11.5 | 1.4 |
| 15 | S10EV | 16.8 | 19.6 | 17.1 | 0.9 |
| 20 | S10EV | 18.8 | 21.6 | 22.3 | 0.9 |
| 15 | S10MHE, pH 10 | 12.9 | 39.5 | 35.0 | 0.33 |
| 15 | S10MHE, pH 2.5 | 11.4 | 66.6 | 50.8 | 0.17 |
| 23.7 | S11MA | 12.2 | 85.9 | 68.7 | 0.14 |
| 35 | S11MA | 8.3 | 77.9 | 83.5 | 0.11 |
| 50 | S11MA | 4.6 | 31.9 | 87.4 | 0.14 |
| 50 | S11MA | 9.8 | 83.0 | 89.4 | 0.12 |

S10EV = Polystyrene, 10,000 $\overline{M}n$, Vinyl Ether Terminal Group
S10MHE = Polystyrene, 10,000 $\overline{M}n$, Maleic Half Ester Terminal Group
S11MA = Polystyrene, 11,000 $\overline{M}n$, Methacrylate Terminal Group AIBN (0.5% by weight styrene) is introduced by syringe and the macromolecular monomer is allowed to dissolve. The clear monomer solution is transferred by syringe into a well-purged 12 ounce bottle containing an aqueous polyvinyl pyrrolidone solution (300 grams of water, 0.24 gram Luviskol K-90 (PVP, 0.3% by weight)). The bottle is capped, briefly purged with nitrogen, and rotated in a 65°C bottle polymerization bath. After 17.5 hours at 65°C, the bottle is finished at 95°C for 3 hours.

The product beads are filtered on a screen, washed with distilled water, and dried at 40°C under vacuum. The product is milled for 2 minutes at 150°C and 0.40 gram Ionol CP antioxidant is added on the mill. A yield of 75.8 grams of transparent milled product is obtained. The styrene conversion is 98 percent.

EXAMPLE 41

Preparation Of Graft Copolymer Of Polytetramethylene Ether Diisocyanate And Polystyrene Macromolecular Monomer Terminated With Epichlorohydrin Polytetramethylene ether diisocyanate is prepared by dissolving 290 grams of polytetramethylene ether glycol having an average molecular weight of 2,900 in 600 ml. of tetrahydrofuran purging this solution with nitrogen and then adding 14.4 grams (0.05 mole) of a liquid diisocyanate similar in structure to diphenylmethane diisocyanate and available as Isonate 143L from the Upjohn Company. The bottle containing these reactants is capped and placed in a water bath at 50°C in which it is tumbled at about 30 rpm. After 8 hours, an additional 7.2 grams (0.025 mole) of the above liquid diisocyanate is added and the reaction is continued for another 8 hours. At this point, 4.35 grams (0.05 mole) of 2,4-tolylene diisocyanate is added and the polymerization is continued under the same conditions for another 8 hours.

To a solution of 200 grams of polystyrene macromolecular monomer terminated with epichlorohydrin and having an average molecular weight of 12,000 in 190 ml. of tetrahydrofuran and 100 ml. of water there is added dropwise a sufficient quantity of dilute sulfuric acid to adjust the pH to 2.0. The resulting solution is stirred at 65°C for 8 hours resulting in complete hydrolysis of the epoxide groups to glycol groups.

A mixture of a solution of 60 grams of the above polytetramethylene ether diisocyanate in 60 ml. of tetrahydrofuran, 60 grams of the above polystyrene glycol and 100 ml. of tetrahydrofuran is placed in a polymerization bottle together with 0.6 gram of stannous octoate. The bottle is capped, purged with nitrogen and placed in a water bath at 65°C for 8 hours to produce a graft copolymer. A portion is cast on a glass plate and allowed to air dry to a flexible, elastic film. It is cut into small pieces and molded at 150°C and 20–30 psig to a film the tensile strength of which is found to be 1500 psig.

EXAMPLE 42

Preparation Of Graft Copolymer Of Polytetramethylene Ether Diisocyanate And Polystyrene Glycol A reactor bottle containing a mixture of 87 grams of polytetramethylene ether glycol having an average molecular weight of 2,900 and 4.3 grams (0.015 mole) of the liquid diisocyanate referred to in Example 41 is capped, purged with nitrogen, and placed in a water bath at 65°C for 8 hours. The resulting high molecular weight polyurethane glycol is cooled to room temperature and 43 grams of polystyrene glycol (prepared as in Example 41) having an average molecular weight of 8,600 and 350 ml. of tetrahydrofuran are added and the bottle capped. After purging with nitrogen, 5.9 grams (0.023 mole) of the above liquid diisocyanate is added and the bottle is rotated at 65°C for 8 hours. The resulting graft copolymer is isolated as a flexible, elastic film by depositing it on a glass plate and air drying. Its tensile strength is 1,000 psig.

Polyblends Employing Macromolecular Monomers As Alloying Agents

Polyvinyl chloride blends with low levels of the macromolecular monomer/polyacrylate graft copolymers of the invention provide products that are clear, have improved processing and high impact properties. Notched Izod impact strengths of 22 ft. lbs./inch are obtained with little loss in flexural modulus in rigid polyvinyl chloride blends containing as little as 3 percent of the macromolecular monomer/poly(butyl acrylate) graft copolymer. The graft copolymers of the invention also function as processing aids by improving polyvinyl chloride fusion in milling and compression molding. The graft copolymers also impart high strength to higher molecular weight polyvinyl chloride polymers, such as Vygen 110 and 120, when low levels of the graft copolymer (macromolecular monomer-poly(butyl acrylate) is blended after the polyvinyl chloride is banded on the mill.

EXAMPLE 43

Preparation Of Polyvinyl Chloride/
Macromolecular Monomer Graft Copolymer Polyblend The following ingredients are mixed, and banded on a 150°C lab mill:

| Initial blend | |
|---|---|
| Vygen 120 (Lot 71–20 polyvinyl chloride) | 96.0 g. |
| Stearic Acid | 1.0 g. |
| Cadmium Stearate | 1.5 g. |
| Barium Stearate | 1.5 g. |

During the entire milling operating, the roll gap is adjusted to maintain a rolling bank, and the stock is cut and turned every one-half minute. After the initial blend has been banded on the mill 3 minutes, 4.0 grams of the graft copolymer having polystyrene sidechains and poly(butyl acrylate) backbone (30/70) prepared by the procedure of Example 34 is added to the rolling bank and milling is continued an additional 3 minutes.

The compression-molded specimens (5 minutes at 170°C) are transparent, and had an average notched Izod impact strength of 22 ft. lbs./inch notch, whereas the control without the graft copolymer has an Izod impact strength of 0.4–0.8 ft. lbs/inch.

In addition to using the rubbery polystyrene/butyl acrylate graft copolymer as an alloying agent to polymers of vinyl chloride, the addition of this rubbery component can also be added to polymers of styrene or styrene-acrylonitrile copolymers for impact engineering plastics. The polyvinyl chloride polyblends with the graft copolymers have exceptionally high impact strength and are useful in pipe, siding, downspouts, cases, etc. This is unexpected because polyvinyl chloride is known for its low impact strength. Poly(methyl methacrylate) also has low impact strength, however, when methyl methacrylate is either blended or copolymerized with the lower Tg or rubbery macromolecular monomers of the invention, the impact strength is enhanced.

The graft copolymers of the invention which have polystyrene sidechains, particularly those having polyvinyl chloride backbones, improve the melt rheology of those polymers having a poor melt rheology and are difficult to process when small amounts of the graft copolymer is blended with the polymer. Examples of polymers which can be blended with the graft copolymers of the invention to improve the melt rheology include polymers of vinyl chloride, methyl methacrylate, acrylonitrile, and others.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. A process for preparing a copolymerizable macromolecular monomer, comprising the sequential steps of:

a. polymerizing a vinyl-containing compound in the presence of an alkali metal hydrocarbyl anionic polymerization initiator to produce a monofunctional living polymer or copolymer, said vinyl-containing compound being a member selected from the group consisting of conjugated dienes containing 4 to 12 carbon atoms per molecule and vinyl-substituted aromatic hydrocarbons containing up to 12 carbon atoms and comonomeric mixtures thereof, b. contacting said monofunctional living polymer with an alkylene oxide capping agent having eight or fewer carbon atoms wherein said contacting step (b) is carried out in the presence of amounts of alkylene oxide and under conditions sufficient to thereby obtain a monofunctional alkoxide anion terminated macromolecular monomer, and c. contacting said monofunctional alkoxide terminated macromolecular monomer from step (b) with a halogen-containing compound which also contains a polymerizable moiety, said halogen-containing compound being a member selected from the group consisting of acrylyl halide, methacrylyl halide, vinyl-2-haloethyl ether, vinyl haloacetate, halomethylmaleic anhydride and its esters, allyl halide, methallyl halide, epihalohydrin, and vinyl-benzyl halide, wherein said contacting step (c) is carried out in the presence of amounts of the halogen-containing compound and under conditions to thereby produce a copolymerizable macromolecular monomer characterized as having no more than one copolymerizable moiety per linear polymer or copolymer chain, said copolymerizable macromolecular monomer being further characterized as having a substantially uniform molecular weight distribution such that its ratio of $\overline{M}w/\overline{M}n$ is less than about 1.1, wherein $\overline{M}w$ is the weight average molecular weight of the copolymerizable macromolecular monomer and $\overline{M}n$ is the number average molecular weight of the copolymerizable macromolecular monomer.

2. The process of claim 1, wherein said vinyl-containing compound is a member from the group consisting of styrene and alpha-methylstyrene.

3. The process of claim 1, wherein said vinyl-containing compound is a member selected from the group consisting of butadiene and isoprene.

4. The process of claim 1, wherein said capping agent is ethylene oxide.

5. The process of claim 1, wherein said anionic polymerization initiator is secondary butyl lithium.

6. The process of claim 1, wherein said halogen-containing compound is a member selected from the group consisting of acrylyl chloride and methacrylyl chloride.

7. The process of claim 1, wherein said anionic polymerization initiator is secondary butyl lithium, said vinyl-containing compound is styrene, said capping agent is ethylene oxide, and said monofunctional alkoxide anion terminated macromolecular monomer thereby produced is represented by the structural formula:

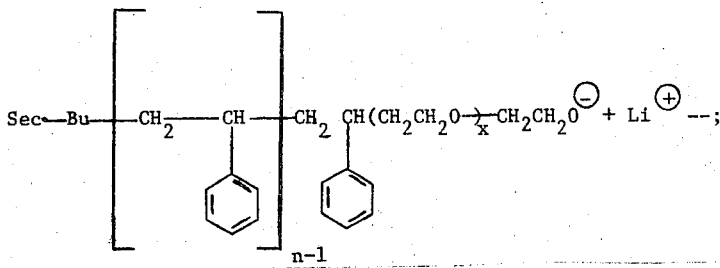

wherein $n$ is a positive integer such that the molecular weight of the copolymerizable macromolecular monomer is in the range of from about 10,000 to about 35,000 and $x$ is a positive integer.

8. The process of claim 1, wherein said copolymerizable macromolecular monomer has a molecular weight in the range of from about 5,000 to about 50,000.

9. The process of claim 1, wherein said copolymerizable macromolecular monomer has a molecular weight in the range of from about 10,000 to about 35,000.

10. The process of claim 1, wherein said vinyl-containing compound is isoprene, said capping agent is ethylene oxide and said halogen-containing compound is methacrylyl chloride.

11. The process of claim 1, wherein said halogen-containing compound is allyl or methallyl halide.

12. The process of claim 1, wherein said halogen-containing compound is vinyl haloacetate.

13. The process of claim 1, wherein said halogen-containing compound is vinyl-benzyl halide.

* * * * *